US011300651B1

(12) United States Patent
Patel et al.

(10) Patent No.: US 11,300,651 B1
(45) Date of Patent: Apr. 12, 2022

(54) SYSTEM FOR AUGMENTING 360-DEGREE ASPECT MONOSTATIC RADAR CROSS SECTION OF AN AIRCRAFT

(71) Applicant: The United States of America, as Represented by the Secretary of the Navy, Arlington, VA (US)

(72) Inventors: Yogeshkumar M. Patel, Ventura, CA (US); Robert Barreto, Ventura, CA (US); Christopher F. Calderon, Oxnard, CA (US); Nathan Andrew Alday, Ventura, CA (US); Andrew Hamilton Kay, Lynn Haven, FL (US); Paul Nelson, Oxnard, CA (US); Donald Patrick Hilliard, Camarillo, CA (US); Dean Lucian Mensa, Ventura, CA (US); Leroy Francis Mumma, Oxnard, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 580 days.

(21) Appl. No.: 16/353,462

(22) Filed: Mar. 14, 2019

(51) Int. Cl.
*G01S 7/03* (2006.01)
*G01S 13/933* (2020.01)
(Continued)

(52) U.S. Cl.
CPC .............. *G01S 7/032* (2013.01); *G01S 13/75* (2013.01); *G01S 13/933* (2020.01); *H01Q 15/08* (2013.01); *H01Q 15/23* (2013.01); *G01S 7/027* (2021.05)

(58) Field of Classification Search
CPC ...... F41J 2/00; F41J 9/08; G01S 7/027; G01S 7/032; G01S 13/75; G01S 13/933;
(Continued)

(56) References Cited

U.S. PATENT DOCUMENTS 3,283,324 A * 11/1966 Norman, Jr. ............ G01S 13/75
342/11
3,413,636 A * 11/1968 Migdal .................. H01Q 15/23
342/11
(Continued)

OTHER PUBLICATIONS

Wikipedia, Luneburg Lens, webpage, Oct. 18, 2017, United States.
Rozendal Associates, Luneberg Lenses, web catalog, 2015, United States.

*Primary Examiner* — Vladimir Magloire
*Assistant Examiner* — Oladimeji Oyegunle
(74) *Attorney, Agent, or Firm* — Naval Air Warfare Center Weapons Division; Jimmy M. Sauz; James M. Saunders

(57) ABSTRACT

A system for augmenting 360-degree aspect monostatic radar cross section of an aircraft. The system may comprise a pair of pods mountable on opposing wing tips of an aircraft and each having a pod housing with an elongate body tapering forwardly to a nose and rearwardly to a tail. Each pod may comprise a forward SDL disposed within the nose, a rear SDL disposed within the tail, and a pair of mid-body SDLs disposed within a mid-section of the pod housing. The SDLs may be arranged within the pods to reflect radiation and provide coverage around the aircraft over a region of about 360 azimuth degrees. Each SDL may comprise radar absorbing material located on an interior reflective surface, and portions of the elongate bodies may be constructed of radome material. The SDLs may be Luneburg lens having diameters of at least approximately 8-inches.

18 Claims, 10 Drawing Sheets

(51) Int. Cl.
*G01S 13/75* (2006.01)
*H01Q 15/08* (2006.01)
*H01Q 15/23* (2006.01)
*G01S 7/02* (2006.01)

(58) Field of Classification Search
CPC ...... G01S 7/4004; H01Q 15/08; H01Q 15/23; H01Q 15/14; H01Q 1/28; H01Q 15/0013; H01Q 15/18; H01Q 17/001
See application file for complete search history.

(56) References Cited

U.S. PATENT DOCUMENTS

| | | | |
|---|---|---|---|
| 3,465,362 A | | 9/1969 | Ochiai |
| 4,989,007 A | * | 1/1991 | Coffey ........................ F41J 2/00 342/11 |

* cited by examiner

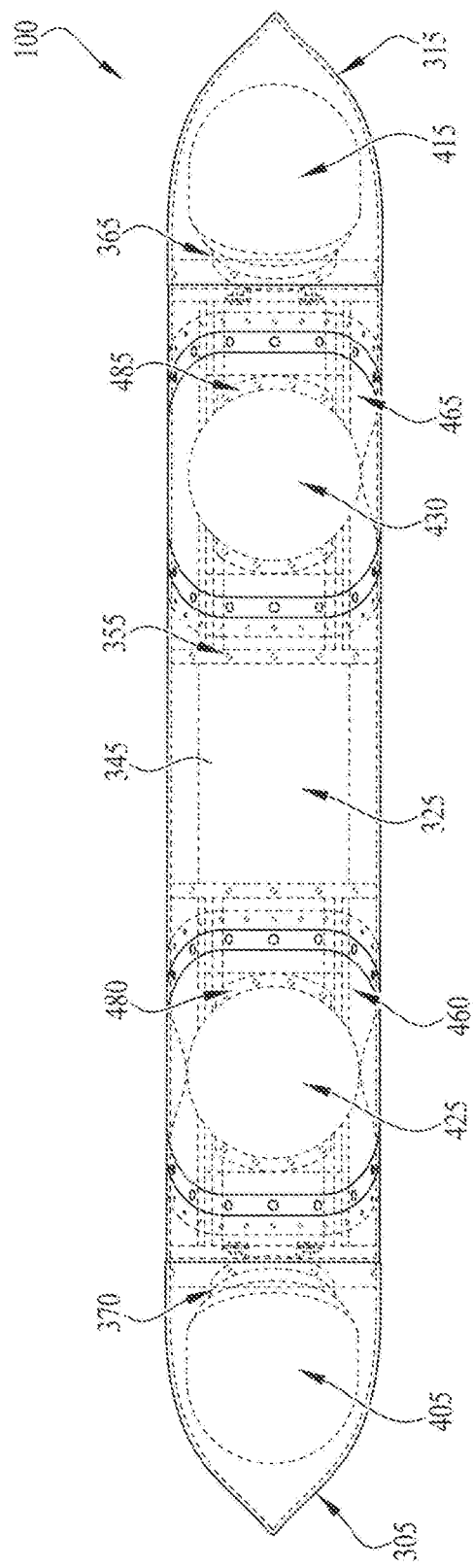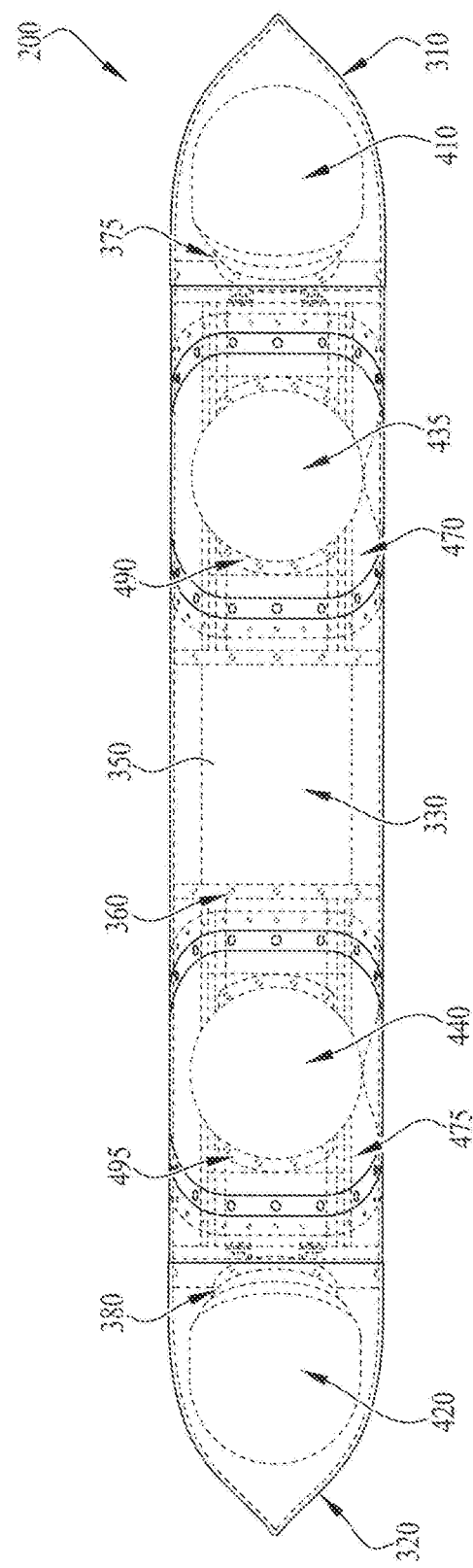

US 11,300,651 B1

SYSTEM FOR AUGMENTING 360-DEGREE ASPECT MONOSTATIC RADAR CROSS SECTION OF AN AIRCRAFT

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor. The subject matter of this invention is related to work conducted under contract agreement N68936-15-D-0004.

FIELD OF USE

The present disclosure relates generally to spherical dielectric lens and radar cross section augmenters.

BACKGROUND

Subscale aerial drone targets (herein referred to as "subscale target") may be used to represent various types of airborne threats, such as cruise missiles and aircraft. Due to their limited physical size, however, subscale drone targets usually have inadequate monostatic radar cross section (RCS) to emulate larger aircraft such as fighter jets and bomber aircrafts. Although radar cross section augmenters have been contemplated, these augmenters are generally located within the nose of the subscale target and thus are limited to relatively narrow aspect angles, which makes them inadequate for various types of tests.

Conventional attempts to cover wider aspect angle ranges using multiple augmenters on sub-scale targets have been unsuccessful due to the limited volume of the target and unavoidable interference effects of the lens. In particular, the reflection crossover resulting from multiple augmenters generally cause uncontrolled scintillation over various aspect angles in the RCS pattern. As a result, certain tests require the use of expensive full-scale fighter aircraft to represent realistic fighter aircraft RCS.

Therefore, based on the foregoing, a need exists that overcomes these deficiencies.

SUMMARY OF ILLUSTRATIVE EMBODIMENTS

To minimize the limitations in the related art and other limitations that will become apparent upon reading and understanding the present specification, the following discloses embodiments of a new and useful system for augmenting 360-degree aspect monostatic radar cross section (RCS) of an aircraft.

One embodiment may be a pod for augmenting the monostatic RCS of an aircraft, comprising: a pod housing capable of being mounted onto a wing of an aircraft and having an elongated body, which tapers forwardly to a nose and rearwardly to a tail and a plurality of approximately spherical dielectric lens (SDL), comprising: a forward SDL disposed within the nose; a rear SDL disposed within the tail; and at least two mid-body SDLs disposed within a mid-section of the elongate body; wherein the plurality of SDLs may be arranged to reflect electromagnetic radiation and provide RCS coverage over a region around the pod of about 0 to 180 degrees in an azimuthal plane. The forward SDL, the rear SDL, and the at least two mid-body SDLs may comprise a reflective surface located within and radar absorbing material (RAM) on at least a portion of the reflective surface. Portions of the nose, the tail, and the mid-section of the elongate body may be constructed of radome material that is substantially transparent to the electromagnetic radiation; wherein the radome material portions may substantially cover front hemispherical surfaces of the forward SDL, the rear SDL, and the at least two mid-body SDLs. The pod housing may extend along a longitudinal axis; wherein the forward SOL and the rear SDL may be situated opposite of each other on the longitudinal axis and may have radiation axes at about 30 degrees and 150 degrees, respectively, relative to the longitudinal axis in the azimuthal plane; wherein the forward SDL may provide RCS coverage over a region between approximately 0 to 75 degrees in azimuth; and wherein the rear SDL may provide RCS coverage over a region between approximately 105 to 180 degrees in azimuth. The at least two mid-body SDLs may be situated along the longitudinal axis of the pod housing and may be disposed between the forward SDL and the rear SDL; wherein the radiation axes of the at least two mid-body SDLs may be substantially perpendicular to the longitudinal axis in the azimuthal plane; and wherein the at least two mid-body SDLs may provide RCS coverage over a region between approximately 75 to 105 degrees in azimuth. The forward SDL, the rear SDL, and the at least two mid-body SDLs may be Luneburg lens. The forward SDL, the rear SDL, and the at least two mid-body SDLs may have diameters of at least approximately 8-inches.

Another embodiment may be a system for augmenting 360-degree aspect monostatic RCS of an aircraft, comprising: (1) first and second pods adapted to mount on opposing wings of an aircraft and comprising first and second pod housings, respectively, each of which having an elongate body that tapers forwardly to a nose and rearwardly to a tail; (2) a first plurality of SDLs, comprising: a first forward SDL disposed within the nose of the first pod housing; a first rear SDL disposed within the tail of the first pod housing; at least two first mid-body SDLs disposed within a mid-section of the first pod housing; and (3) a second plurality of SDLs, comprising: a second forward SDL disposed within the nose of the second pod housing; a second rear SDL disposed within the tail of the second pod housing; and at least two second mid-body SDLs disposed within a mid-section of the second pod housing; wherein the first and second plurality of SDLs may be arranged within the first and second pod housings, respectively, to reflect electromagnetic radiation and provide RCS coverage around a port side of the aircraft over a region of about 0 to 180 degrees in an azimuthal plane and around a starboard side of the aircraft over a region of about 180 to 360 degrees in the azimuthal plane. The first and second forward SDLs, the first and second rear SDLs, and the at least two first and second mid-body SDLs may comprise a reflective surface located within and RAM on at least a portion of the reflective surface. Portions of the noses, the tails, and the mid-sections of the elongate bodies may be constructed of radome material that is substantially transparent to the electromagnetic radiation; wherein the radome material portions may substantially cover front hemispherical surfaces of the first and second forward SDLs, the first and second rear SDLs, and the at least two first and second mid-body SDLs. The first and second pod housings may extend along first and second longitudinal axes, respectively; wherein the first forward SDL and the first rear SDL may be situated opposite of each other on the first longitudinal axis and may have radiation axes at about 30 degrees and 150 degrees, respectively, relative to the first longitudinal axis in the azimuthal plane; wherein the second forward SDL and the second rear SDL may be situated opposite of each other on the second longitudinal axis and may have radiation axes at about 330 degrees and 210 degrees, respectively, relative to the second longitudinal axis in the azimuthal plane; and wherein the radiation axes of the first and second forward SDLs and the first and second rear SDLs may be somewhat diametrically opposed to each other. The at least two first mid-body SDLs may be situated along the first longitudinal axis and may be disposed between the first forward SDL and the first rear SDL within the first pod housing; wherein the radiation axes of the at least two second mid-body SDLs may be substantially perpendicular to the first longitudinal axis in the azimuthal plane; wherein the at least two second mid-body SDLs may be situated along the second longitudinal axis and may be disposed between the second forward SDL and the second rear SDL within the second pod housing; and wherein the radiation axes of the at least two second mid-body SDLs may be substantially perpendicular to the second longitudinal axis in the azimuthal plane. The first and second forward SDLs, the first and second rear SDLs, and the at least two first and second mid-body SDLs may be Luneburg lens. The first and second forward SDLs, the first and second rear SDLs, and the at least two first and second mid-body SDLs may have diameters of at least approximately 8-inches.

Another embodiment may be a system for augmenting 360-degree aspect monostatic RCS of an aircraft, comprising: (1) first and second wing tip pods adapted to mount on opposing wing tips of an aircraft and comprising first and second pod housings, respectively, each of which having an elongate body that tapers forwardly to a nose and rearwardly to a tail; (2) a first plurality of SDLs, comprising: a first forward SDL disposed within the nose of the first pod housing; a first rear SDL disposed within the tail of the first pod housing; and a first pair of mid-body SDLs disposed within a mid-section of the first pod housing; and (3) a second plurality of SDLs, comprising: a second forward SDL disposed within the nose of the second pod housing; a second rear SDL disposed within the tail of the second pod housing; and a second pair of mid-body SDLs disposed within a mid-section of the second pod housing; wherein the first and second plurality of SDLs may be arranged within the first and second pod housings, respectively, to reflect electromagnetic radiation and provide RCS coverage around a port side of the aircraft over a region of about 0 to 180 degrees in an azimuthal plane, around a starboard side of the aircraft over a region of about 180 to 360 degrees in the azimuthal plane, and about +/−55 degrees in an elevation plane; and wherein the first and second forward SDLs, the first and second rear SDLs, and the first and second pairs of mid-body SDLs may comprise a reflective surface located within and RAM on at least a portion of the reflective surface. Portions of the noses, the tails, and the mid-sections of the elongate bodies may be constructed of radome material that is substantially transparent to the electromagnetic radiation; and wherein the radome material portions may substantially cover front hemispherical surfaces of the first and second forward SDLs, the first and second rear SDLs, and the first and second pairs of mid-body SDLs. The first and second pod housings may extend along first and second longitudinal axes, respectively; wherein the first forward SDL and the first rear SDL may be situated opposite of each other on the first longitudinal axis and may have radiation axes at about 30 degrees and 150 degrees, respectively, relative to the first longitudinal axis in the azimuthal plane; wherein the second forward SDL and the second rear SDL may be situated opposite of each other on the second longitudinal axis and may have radiation axes at about 330 degrees and 210 degrees, respectively, relative to the second longitudinal axis in the azimuthal plane; and wherein the radiation axes of the first and second forward SDLs and the first and second rear SDLs may be somewhat diametrically opposed to each other. The first pair of mid-body SDLs may be situated along the first longitudinal axis of the first pod housing and may be disposed between the first forward SDL and the first rear SDL; wherein the radiation axes of the first pair of mid-body SDLs may be substantially perpendicular to the first longitudinal axis in the azimuthal plane; and wherein the first pair of mid-body SDLs may provide RCS coverage over a region between approximately 75 to 105 degrees in azimuth; wherein the second pair of mid-body SDLs may be situated along the second longitudinal axis of the second pod housing and may be disposed between the second forward SDL and the second rear SDL; wherein the radiation axes of the second pair of mid-body SDLs may be substantially perpendicular to the second longitudinal axis in the azimuthal plane; and wherein the second pair of mid-body SDLs may provide RCS coverage over a region between approximately 255 to 285 degrees in azimuth. The first and second forward SDLs, the first and second rear SDLs, and the first and second pairs of mid-body SDLs may be Luneburg lens. The first and second forward SDLs, the first and second rear SDLs, and the first and second pairs of mid-body SDLs may have diameters of at least approximately 8-inches.

The advantage of the system disclosed herein generally lies in its ability to enhance, augment, and manipulate the RCS of an aircraft in 360-degrees aspect angle. Specifically, embodiments of the system may be configured to mount on opposing wings of a fixed-winged aircraft (e.g., aircraft's wing tips) and may comprise a plurality of SDLs such as Luneberg lens. The SDLs may be configured to receive electromagnetic radiation from a monostatic radar transmitter, and in turn, the SDLs may propagate, direct, and focus that electromagnetic radiation back to the monostatic radar in order to increase the RCS of the aircraft.

It is an object to provide a system for augmenting or increasing the RCS of an aircraft.

It is an object to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The drawings are illustrative embodiments. They do not illustrate all embodiments. They do not set forth all embodiments. Other embodiments may be used in addition or instead. Details, which may be apparent or unnecessary, may be omitted to save space or for more effective illustration. Some embodiments may be practiced with additional components or steps and/or without all of the components or steps, which are illustrated. When the same numeral appears in different drawings, it is intended to refer to the same or like components or steps.

FIGS. 3A to 3D depict embodiments of first and second pods of the system.

Figure 1:
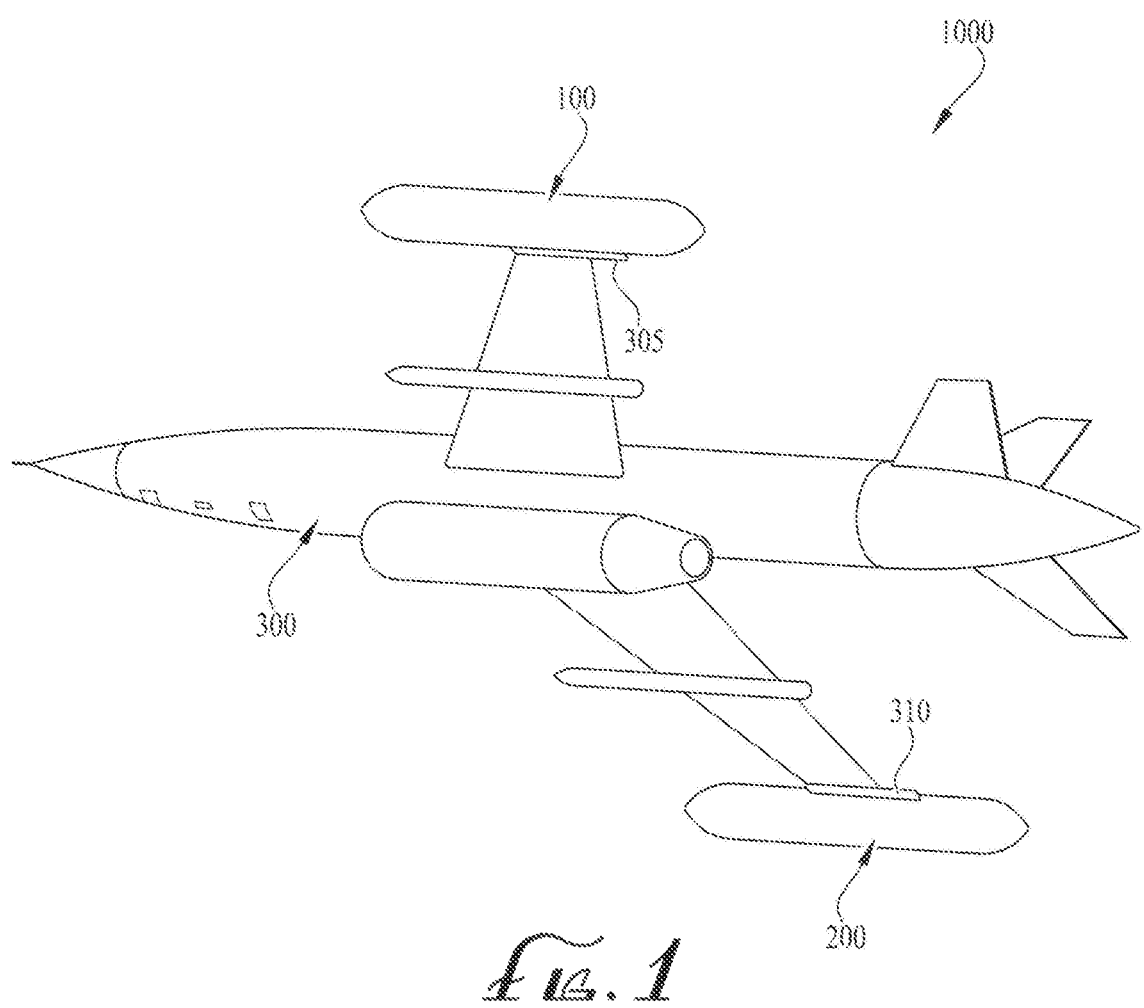
FIG. 1 is a perspective view of one embodiment of the system mounted on an aircraft.

DETAILED DESCRIPTION OF ILLUSTRATIVE EMBODIMENTS in the following detailed description, numerous specific details are set forth in order to provide a thorough understanding of various aspects of one or more embodiments of the system for augmenting 360-degree aspect monostatic radar cross section (RCS) of an aircraft. However, these embodiments may be practiced without some or all of these specific details. In other instances, well-known methods, procedures, and/or components have not been described in detail so as not to unnecessarily obscure the aspects of these embodiments.

Before the embodiments are disclosed and described, it is to be understood that these embodiments are not limited to the particular structures, process steps, or materials disclosed herein, but is extended to equivalents thereof as would be recognized by those ordinarily skilled in the relevant arts. It should also be understood that the terminology used herein is used for the purpose of describing particular embodiments only and is not intended to be limiting.

Reference throughout this specification to "one embodiment," "an embodiment," or "another embodiment" may refer to a particular feature, structure, or characteristic described in connection with the embodiment of the present disclosure. Thus, appearances of the phrases "in one embodiment" or "in an embodiment" in various places throughout this specification may not necessarily refer to the same embodiment.

Furthermore, the described features, structures, or characteristics may be combined in any suitable manner in various embodiments. In the following description, numerous specific details are provided, such as examples of materials, fasteners, sizes, lengths, widths, shapes, etc . . . , to provide a thorough understanding of the embodiments. One skilled in the relevant art will recognize, however, that the scope of protection can be practiced without one or more of the specific details, or with other methods, components, materials, etc. . . . . In other instances, well-known structures, materials, or operations are generally not shown or described in detail to avoid obscuring aspects of the disclosure.

DEFINITIONS

In the following description, certain terminology is used to describe certain features of the embodiments of the system for augmenting 360-degree aspect RCS of an aircraft. For example, as used herein, unless otherwise specified, the term "substantially" refers to the complete, or nearly complete, extent or degree of an action, characteristic, property, state, structure, item, or result. As an arbitrary example, an object that is "substantially" surrounded would mean that the object is either completely surrounded or nearly completely surrounded. The exact allowable degree of deviation from absolute completeness may in some cases depend on the specific context. However, generally speaking, the nearness of completion will be so as to have the same overall result as if absolute and total completion were obtained.

The use of "substantially" is equally applicable when used in a negative connotation to refer to the complete or near complete lack of an action, characteristic, property, state, structure, item, or result. As another arbitrary example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "approximately" may refer to a range of values of ±10% of a specific value.

As used herein the term "somewhat" refers to a range of values of ±50% of a specific value.

As used herein, the term "about" is used to provide flexibility to a numerical range endpoint by providing that a given value may be "a little above" or "a little below" the endpoint. In some cases, the term "about" is to include a range of not more than about two inches of deviation.

As an illustration, a numerical range of "about 1 inch to about 5 inches" should be interpreted to include not only the explicitly recited values of about 1 inch to about 5 inches, but also include individual values and sub-ranges within the indicated range. Thus, included in this numerical range are individual values such as 2, 3, and 4 and sub-ranges such as from 1-3, from 2-4, and from 3-5.

This same principle applies to ranges reciting only one numerical value and should apply regardless of the breadth of the range or the characteristics being described.

As used herein, the term "electromagnetic radiation" refers to energy emanating from oscillation of transverse electric and magnetic fields. Electromagnetic radiation is generally characterized by a wave of disturbance of wavelength, $\lambda$, which is the distance between peaks of the wave for a given frequency, which may be the number of occurrences the wave returns to its original displacement per unit time as it passes a fixed point. The velocity of a radiating electromagnetic wave is the speed of light, c, which is related the wavelength and frequency according to $c=\text{lambda}*f$. Electromagnetic radiation may include, without limitation, electromagnetic fields and electromagnetic signals such as radar transmit and receive signals.

As used herein, the term "radiation axis" refers to a fixed reference line to which electromagnetic radiation travels which is the direction of wave propagation. For example, with respect to spherical dielectric lens (SDL), the radiation axis may be the reference path to which electromagnetic radiation travels and reflects from the centerline or center direction of an SDL.

Distances, forces, weights, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited.

This same principle applies to ranges reciting only one numerical value and should apply regardless of the breadth of the range or the characteristics being described.

As used herein, the term "aircraft" refers to any vehicle or machine capable of flight and capable of utilizing the embodiments of the system disclosed herein. The term "aircraft" also includes sub-scale targets such as aerial target drones and unmanned aerial vehicles.

As used herein in this disclosure, the singular forms "a" and "the" may include plural referents, unless the context clearly dictates otherwise. Thus, for example, reference to an "insert" can include reference to one or more of such inserts.

This disclosure relates generally to spherical dielectric lens (SDL) for augmenting the RCS of an aircraft. In general, aerial target drones and unmanned aerial vehicles may represent various types of airborne threats such as cruise missiles and aircraft. When the aerial targets are smaller in physical size (i.e., subscale), they usually have inadequate RCS to represent full-scale fighter and bomber aircraft. Although sub-scale targets have previously been configured with augmenters to increase RCS to aircraft levels, these augmenters are generally situated within the nose of the aircraft and are generally limited to relatively narrow range of aspect angles, making them inadequate for various tests. Importantly, attempts to use multiple augmenters to cover wider aspect angle ranges on sub-scale targets are generally restricted due to intermediate aspect angle coverage with missing aspect angles, or undesirable overlapping of augmenter coverage, causing unwanted inter-augmenter interference effects due to scintillation. As a result, expensive full-scale fighter aircraft have been used to facilitate testing in order to present realistic fighter aircraft RCS.

Accordingly, the embodiments disclosed herein solve this problem by utilizing a set of SDLs, which may be modified Luneburg lenses. The SDLs are preferably integrated into pods such as wing tip mounted aerodynamic pods to provide 360° azimuth and +/−55° elevation RCS coverage representative of fighter and bomber sized aircraft. The embodiments are also preferably a fraction of the cost of operating and maintaining full-scale aircrafts.

In the accompany drawings, like reference numbers indicate like elements. Reference character 1000 depicts embodiments of the system for augmenting 360-degree aspect monostatic RCS of an aircraft. Some embodiments depict cross section views. The patterning of the section hatching is for illustrative purposes only to aid in viewing and should not be construed as being limiting or directed to a particular material or materials.

FIG. 1 is a perspective view of one embodiment of the system mounted on an aircraft. As shown in FIG. 1, one embodiment of the system 1000 may comprise two wing tip pods 100, 200 adapted to couple, attach, or mount onto opposing wings of an aircraft 300. In particular, FIG. 1 shows that in one embodiment, the first pod 100 may attach or mount onto the left wing tip 305 of the aircraft 300, whereas the second pod 200 may be attach or mount onto the right wing tip 310 of the aircraft 300. In alternative embodiments, the pods may attach beneath the wings of the aircraft 300.

The aircraft 300 may be any machine or vehicle capable of traveling through air. In various embodiments, the aircraft 300 may be an unmanned aircraft such as an unmanned aerial vehicle (UAV) or drone. In an exemplary embodiment, the aircraft 300 may be a sub-scale aerial target or vehicle representative of larger aircraft such as fighter jets or bombers.

In general, embodiments of the system 1000 preferably augment or manipulate the RCS of an aircraft 300 in 360-degrees aspect angle and is generally configured to operate with monostatic radars. The system 1000 preferably utilizes spherical dielectric lens (SDL) to receive electromagnetic radiation from a radar transmitter, and in turn, propagates and directs the electromagnetic radiation back to the radar receiver. Preferably, the radar transmitter and receiver are collocated, which is defined as monostatic. Importantly, the SDLs preferably focuses that electromagnetic radiation in order to increase the RCS of the aircraft 300.

In an exemplary embodiment, the SDLs may be Luneburg lens. The pods 100, 200 of the system 1000 may also operate at frequencies corresponding to the frequency range of the SDL. For example, in one embodiment, the pods 100, 200 may operate in the X-band with a frequency range covering approximately 8 to 12 GHz. Other frequencies are possible with appropriately sized SDL's.

In one implementation, the system 1000 may be installed on an aerial drone with the following dimensions: 23 feet in length and a wingspan of approximately 12 feet. Thus, by utilizing the system 1000, the RCS of the drone may increase, such that the apparent length to a radar is over 150 feet and the wingspan is over 60 feet.

Importantly, embodiments of the system 1000 are preferably configured to function with vertical and horizontal linear radar co-polarizations (i.e., vertical transmit/vertical receive, horizontal transmit/horizontal receive). Embodiments of the system 1000, however, generally do not function with linear radar cross polarization (i.e., horizontal transmit/vertical receive, vertical transmit/horizontal receive). In exemplary embodiments, the system 1000 may function with circular co-polarization radars (i.e., right hand circular transmit/left hand circular receive, left hand circular transmit/right hand circular receive) but may not function with circular cross polarized radars.

Figure 2:
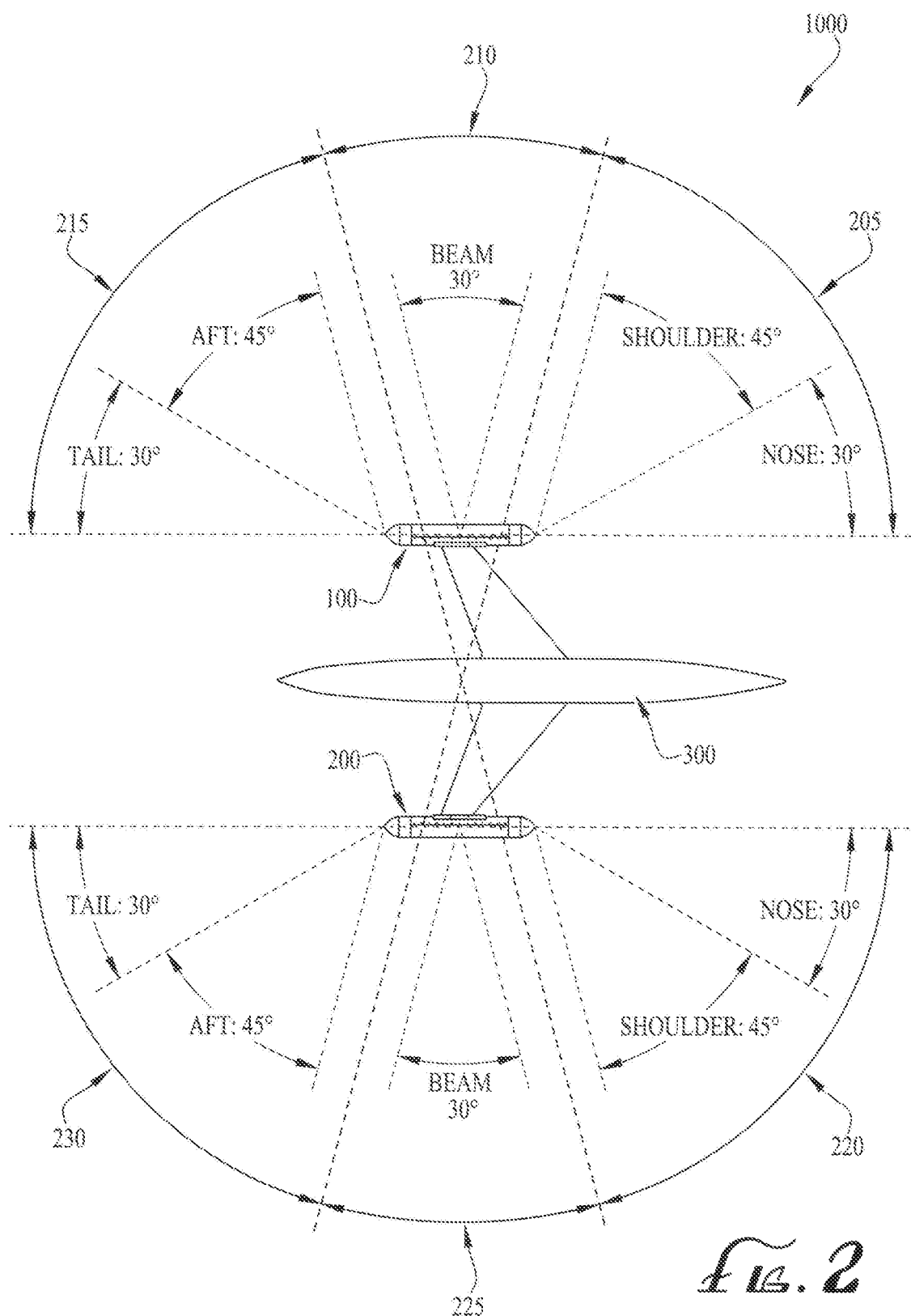
FIG. 2 is a top plan view of one embodiment of the system mounted on an aircraft and shows the RCS coverage of the system and corresponding aspect angles.

FIG. 2 is a top plan view of one embodiment of the system mounted on an aircraft and shows the RCS coverage of the system and corresponding aspect angles. As shown in FIG. 2, one embodiment of the system 1000 may comprise pods 100, 200, which are preferably wing tip pods that are aerodynamic. FIG. 2 also shows that each pod 100, 200 may provide RCS coverage for approximately half of the azimuth aspect angles of the aircraft 300 (i.e., 0 to 180 degrees). The left wing tip pod 100, for instance, may cover 0 to 180 degrees in azimuth relative to the port or left side of the aircraft 300 via four SDLs: (1) a forward SDL 405 (shown in FIG. 3A) situated within the nose 305 (shown in FIG. 3A) or forward portion of the pod 100 and covering nose and shoulder aspect angles 205 of the aircraft 300 (i.e., approximately 0 to 75 degrees in azimuth); (2) two mid-body SDLs 425, 430 (shown in FIG. 3A) disposed within a mid-section of the pod 100 and covering a beam aspect angle 210 of the broadside of the aircraft 300 (i.e., approximately 75 to 105 degrees in azimuth); and (3) a rear SDL 415 situated within the tail 315 or rearward portion of the pod 100 and covering the tail and aft aspect angles 215 of the aircraft 300 (i.e., approximately 105 to 180 degrees in azimuth).

Similarly, the right wing pod 200 may cover 0 to −180 degrees in azimuth relative to the starboard or right side of the aircraft 300 via four SDLs: (1) a forward SDL 410

(shown in FIG. 3B) situated within the nose 310 or forward portion of the pod 200 and covering a nose and shoulder aspect angles 220 of the aircraft 300 (i.e., approximately 0 to −75 degrees in azimuth); (2) two mid-body SDLs 435, 440 (shown in FIG. 3B) disposed within a mid-section of the pod 200 and covering a beam aspect angle 225 of the broadside of the aircraft 300 (i.e., approximately −75 to −105 degrees in azimuth); and (3) a rear SDL 420 (shown in FIG. 3B) situated within the tail 320 or rearward portion of the pod 200 and covering the tail and aft aspect angles 230 of the aircraft 300 (i.e., approximately −105 to −180 degrees in azimuth).

The SDL may be a sphere constructed of a dielectric material, comprising a plurality of spherical shell layers and whose specific dielectric constant increases as the center of the lens is approached. Specifically, the dielectric constant K of each layer may function solely of the distance r from the center of the lens or radius of the layer. The specific dielectric constant K may be determined the following equation:

$$K = 2 - \left(\frac{r}{R}\right)^2$$

wherein R may be the outermost radius of the SDL.

The SDL preferably directs electromagnetic radiation or waves in two opposing directions: (1) the first focusing radiation entering the SDL onto the outer spherical surface opposing side of the lens and (2) the second positioned in the opposing direction to incidence at an infinite-point from the lens. As such, electromagnetic waves entering the lens are gradually refracted to be focused to a point on the spherical surface of the lens diametrically opposite the source, and then reflected back by a reflective surface positioned at the surface. In this manner, the SDL may be used as a radar reflector or antenna.

In an exemplary embodiment, the system 1000 may utilize forward and aft SDLs that are approximately 8-inches in diameter. In another exemplary embodiment, the system may utilize forward and aft SDLs that are approximately 8.63 inches in diameter. In these two embodiments, the mid-body SDLs 425, 430, 435, 440 may be 8 inches in diameter.

Figure 3A:
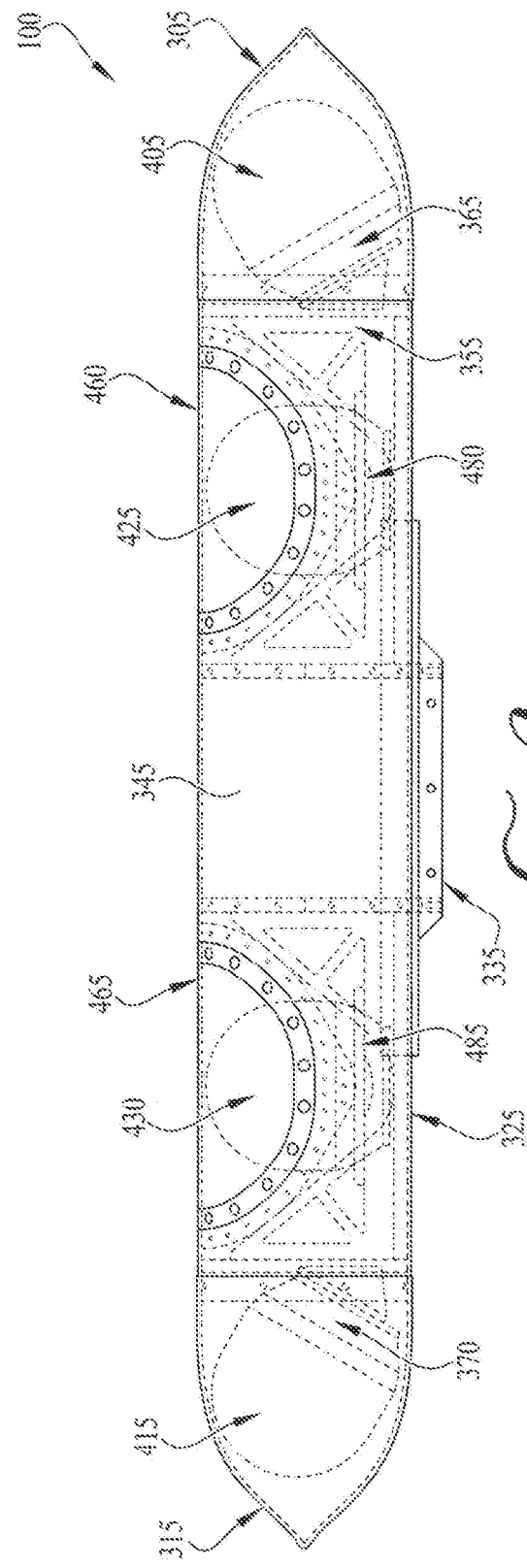
Figure 3B:
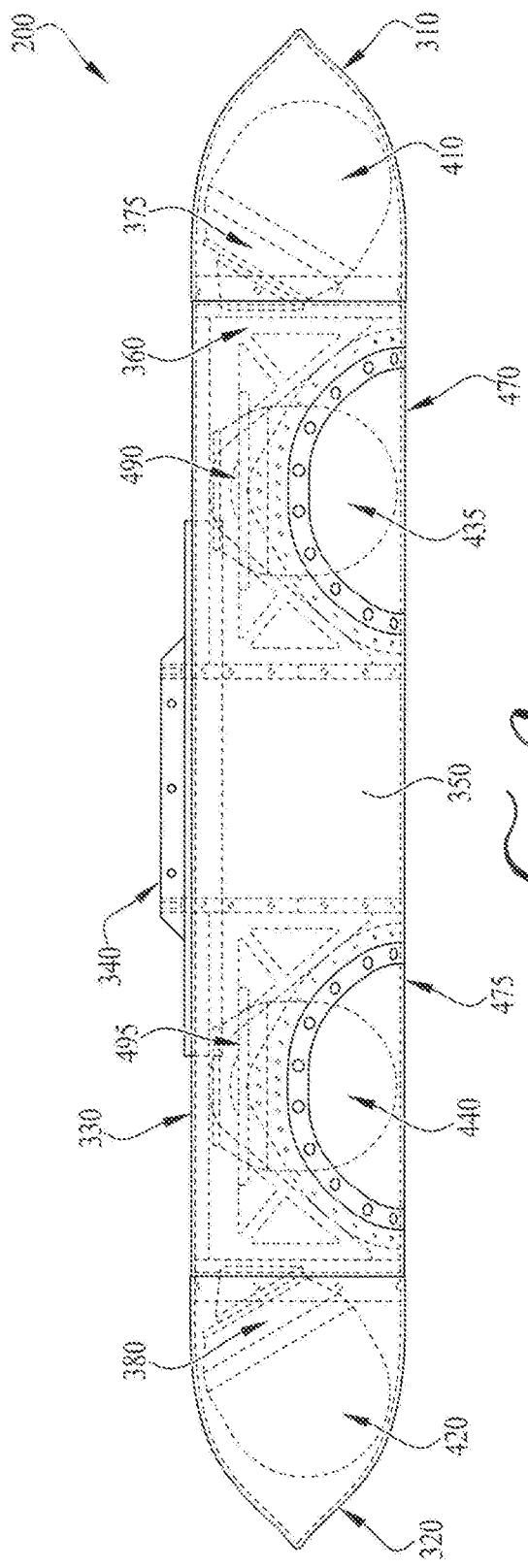

FIGS. 3A to 3D depict embodiments of the first and second pods of the system. Specifically, FIGS. 3A and 3B depict top plan views of the first pod 100 and second pod 200, respectively. FIGS. 3C and 3D, on the other hand, depict side elevation views of the first pod 100 and second pod 200, respectively. The inner components of the first pod 100 and second pod 200 are preferably depicted in broken lines.

As shown in FIGS. 3A to 3D, embodiments of the first pod 100 and second pod 200 may each comprise: a pod housing 325, 330, strongback 335, 340, forward SDL 405, 410, rear SDL 415, 420, and mid-body SDLs 425, 430, 435, 440. The pod housing 325, 330 may be a cover or shell that houses, protects, and encloses the components of the first pod 100 and second pod 200. Each of the pod housings 325, 330 may be constructed of a hard metal, polymer, or composite and may comprise: an elongate body 345, 350 having a nose 305, 310 and tail 315, 320. The noses 305, 310 may be used to protect the forward SDLs 405, 410, and the tails 315, 320 may be used to protect the rear SDLs 415, 420. In various embodiments, the noses 305, 310 and tails 315, 320 may be substantially identical to each other and may be aerodynamically shaped (e.g., cone-shaped). In an exemplary embodiment, the noses 305, 310 and tails 315, 320 (or portions thereof) may be constructed of radome material, which preferably minimally attenuates electromagnetic signals. Such radome material may include composite materials, various fiber reinforced polymers, and ceramics.

Each pod housing 325, 330 may also comprise an internal harness framework 355, 360 and strongback 335, 340. The strongbacks 335, 340 may be used to provide support to the pod housings 325, 330 and may comprise metal beams for structural reinforcement of the pod housings 325, 330. Embodiments of the strongbacks 335, 340 may also be used to attached to the pod housings 325, 330 via welding. In multiple embodiments, the strongback 335, 340 may be adapted to couple or attach to a wing of an aircraft 300, and in an exemplary embodiment, the strongback 335, 340 may be configured to mount onto the wing tips of the aircraft 300.

The internal harness framework 355, 360 may be a structure used to mount and secure the SDLs within the pod housings 325, 330. The internal harness framework 355, 360 may also provide additional structural strength to the pod housings 325, 330 and may provide precision fastening of the SDLs via mounting brackets 365, 370, 375, 380. The mounting brackets 365, 370, 375, 380 may be attached to the rear portions of the forward SDLs 405, 410 and rear SDLs 415, 420 and may comprise a reference notch above the mounting brackets 365, 370, 375, 380. In this manner, the forward SDLs 405, 410 and rear SDLs 415, 420 may be aligned in the appropriate direction to ensure that the radar absorbing material (RAM) 450 (shown in FIGS. 4A and 4B) located within the forward SDLs 405, 410 and rear SDLs 415, 420 are in proper orientation. Otherwise, misalignment of the orientation of the forward SDLs 405, 410 and/or rear SDLs 415, 420 would likely result in significant RCS coverage errors. Additional information about RAM is discussed further below.

FIGS. 3A to 3D also show that each pod housing 325, 330 may comprise one or more openings for the mid-body SDLs 425, 430, 435, 440 and may be protected by radome covers 460, 465, 470, 475. These openings are also preferably sized to provide sufficient field of view for the mid-body SDLs 425, 430, 435, 440 in order to provide adequate RCS aspect angle coverage for the beam aspect angles 210, 225 in elevation and azimuth. The radome covers 460, 465, 470, 475 (or portions thereof) may be constructed by radome material and may be identical in material and shape.

As recited above, the SDLs may be spherical dielectric lens configured to mount within the pod housing 325, 330 and may include the forward SDLs 405, 410, rear SDLs 415, 420, and mid-body SDLs 425, 430, 435, 440. The forward SDLs 405, 410 and rear SDLs 415, 420 may be mounted within the noses 305, 310 and tails 315, 320, respectively, via mounting brackets 365, 370, 375, 380, which may be secured to the internal harness framework 355, 360. The mid-body SDLs 425, 430, 435, 440 may also be mounted within the elongate body 345, 350 via mounting brackets 480, 485, 490, 495, which may likewise be secured to the internal harness framework 355, 360.

In an exemplary embodiment, the forward SDLs 405, 410, rear SDLs 415, 420, and mid-body SDLs 425, 430, 435, 440 may be Luneburg lens. For example, in one embodiment, the forward SDLs 405, 410 and rears SDL 415, 420 may be 8-inch Luneburg lens having a rear reflective cap. In another embodiment, the forward SDLs 405, 410 and rear SDLs 415, 420 may be 8.63-inch diameter Luneburg lens also having a rear reflective cap. Embodiments of the mid-body SDLs 425, 430, 435, 440 may be 8-inch Luneburg lens likewise including a rear reflective cap. The reflective caps of these SDLs may be integrated or a separate component from the lens portion, and both may be bonded together during assembly.

Each pod housing 325, 330 may extend along an associated longitudinal axis, and the forward SDLs 405, 410 and rear SDLs 415, 420 associated with each pod housing 325, 330 may be angled or tilted outwards from their respective longitudinal axis by approximately 30 degrees. In this manner, the forward SDLs 405, 410 and rear SDLs 415, 420 may accommodate wider azimuth RCS coverage to the side forward and aft aspect angle sectors 205, 215, 220, 230, shown in FIG. 2. This azimuth coverage may overlap with beam angle sectors 210, 225 associated with RCS coverage by the mid-body SDLs 425, 430, 435, 440 shown in FIG. 2. This wider coverage is generally preferred in order to increase the beam aspect RCS in aspect angle sectors 210, 225 in FIG. 2. Regarding orientation, an exemplary embodiment of the mid-body SDLs 425, 430, 435, 440 may direct RCS reflection directly outwards in a perpendicular or orthogonal manner (i.e., approximately 90 degrees outward from the pods 100, 200 respective longitudinal axis) and into the beam angle sectors 210, 225.

Importantly, each of the forward SDLs 405, 410, rear SDLs 415, 420, and mid-body SDLs 425, 430, 435, 440 preferably contain RAM 450 internally applied onto specified portions of the reflective surface 505 located within, as shown in FIGS. 4A, 4B, 5A, and 5B. This may allow the RAM 450 to control or restrict RCS reflections in various spatial regions in order to reduce RCS overlap in forward and rear aspect angle transition regions between SDLs 405, 410, 415, 420. RAM 450 may be constructed of suitably lossy material for absorbing electromagnetic radiation and may include, without limitation, magnetic radar absorbing material (mag RAM).

In another exemplary embodiment, the first pod 100 and second pod 200 may comprise forward SDLs 405, 410 and rear SDLs 415, 420 having 8.63-inch diameter lenses. The 8.63-inch diameter SDL lenses preferably provide larger RCS reflection, but may restrict the SDL to limit the tilt or angle to 20 degrees rather than 30 degrees from their respective longitudinal axis. This may likely limit the forward and aft aspect angle coverage to 75 degrees. Thus, in these embodiments, the tilt angles of the forward SDLs 405, 410 and rear SDLs 415, 420 are preferably angled outwards from their respective longitudinal axis by approximately 20 degrees. As a result, this embodiment utilizing 8.63-inch diameter SDL lenses may limit wider aspect angle coverage of 100 degrees for higher RCS in the forward and aft aspect angle sectors 205, 215, 220, 230 at the expense of extra RCS coverage of the beam sectors 210, 225.

Accordingly, the tilt angles of the forward SDLs 405, 410 and rear SDLs 415, 420 may depend on the size of the lens. For 8-inch SDL Luneberg lens the tilt angle from the respective longitudinal axis is preferably 30 degrees. For 8.63-inch diameter lenses the tilt angle from their respective longitudinal axis is preferably 20 degrees.

Figure 4A:
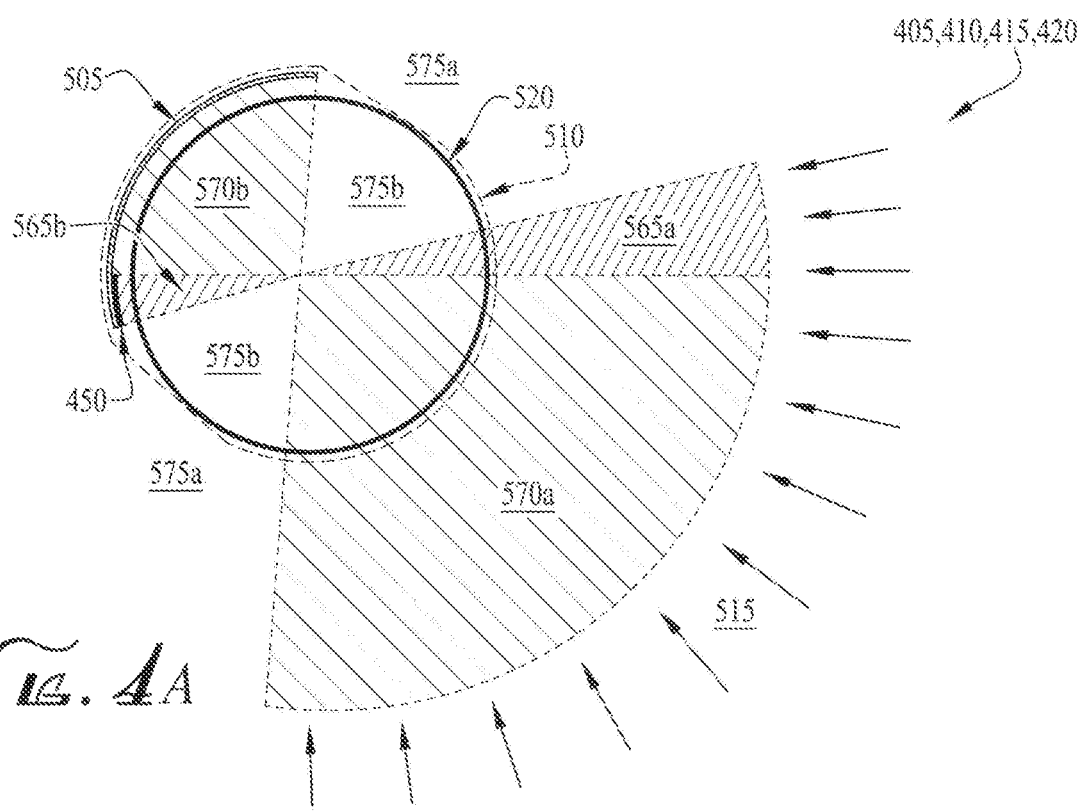
FIGS. 4A and 4B are illustrations of a top plan view and front elevation view, respectively, of embodiments of the forward spherical dielectric lens (SDL) or rear SDL with radar absorbing material (RAM).
Figure 4B:
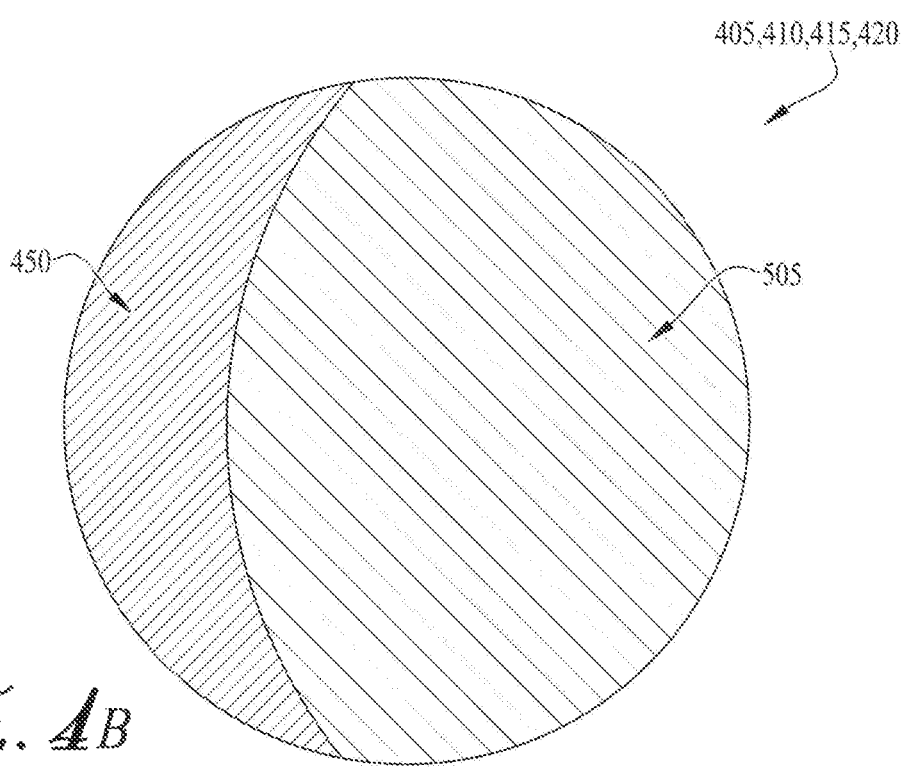

FIGS. 4A and 4B are illustrations of a top plan view and front elevation view, respectively, of embodiments of the forward spherical dielectric lens (SDL) or rear SDL with RAM. FIG. 4A, which is a top plan view, also shows how electromagnetic radiation 515 generally interacts with the forward SDL and rear SDL, and in particular, the reflective surface 505 and RAM 450 located within the forward SDLs 405, 410 and/or rear SDLs 415, 420. Finally, FIG. 4A shows how the RAM 450 affects RCS coverage.

As shown in FIG. 4A, the forward SDLs 405, 410 and/or rear SDLs 415, 420 may be enclosed by a protective outer shell 510 (shown by dashed lines), which may be constructed of a polymer such as plastic. The lens 520 preferably focuses incoming electromagnetic radiation 515 (e.g., radar transmission signals), which may be directed to the reflective surface 505 located at the rear interior portion of the forward SDLs 405, 410 and rear SDLs 415, 420. In one implementation, the interior reflective surface 505 may be an aluminum foil attached the rear portion of the outer shell 510 and may be attached via an adhesive such as glue.

Importantly, FIGS. 4A, 4B, 5A, and 5B shows that the RAM 450 may be applied to one or more sides of the reflective surface 505. In one example, one embodiment of the RAM 450 may be applied to a single side portion of the reflective surface 505 and no more than ⅓ of the reflective surface 505 area. In an alternative embodiment, RAM 450 may be applied to both sides of the reflective surface 505 and no more than ⅔ of the reflective surface area.

In one embodiment, the forward SDLs 405, 410 and/or rear SDLs 415, 420 may be 8-inch Luneburg lens, and the length of the reflective surface 505 may extend approximately one inch further outwards on the opposing side of the RAM 450. In this manner, the reflective surface 505 may provide wider angle coverage in the broadside aspect region. Otherwise, without the extra reflective surface 505, RCS coverage may only extend up to approximately 90 degrees. Therefore, the extra foil may increase RCS coverage up to approximately 100 degrees.

In an exemplary embodiment, the forward SDLs 405, 410 and rear SDLs 415, 420 may further comprise lens 520. The lens 520 may be in contact with the outer shell 510 on the forward area of the hemispherical surface, which may be exposed to incoming electromagnetic radiation 515. A portion of the reflective surface 505 is preferably covered by RAM 450, which may be mag RAM, and the RAM 450 may be adhered to the interior surface via an adhesive. The RAM 450 may also be securely bonded in close contact to interior reflective surface 505 in order for the RAM 450 to function properly.

In an exemplary embodiment, the thickness of the epoxy adhesive or bonding preferably does not exceed a few thousandths of an inch. In this embodiment, the RAM 450 may also be constructed from planar sheets. Thus, in order to minimize possible delamination of the RAM 450 from the reflective surface 505, the surface tension on the adhesive may be minimized by pre-cutting the RAM 450 into serpentine shaped strips prior to bonding. In additional embodiments, various strip shapes and sizes may be used, so long as the RAM 450 is capable of forming onto the foil surface with low surface tension to prevent delamination.

Further, in order to ensure effective performance, the RAM 450 strips may be arranged closely together, typically no greater than a couple thousandths of an inch. The RCS attenuation is also generally dependent on the material properties of the RAM 450. Thus, by utilizing RAM 450 over the reflective surface 505, as shown in FIGS. 4A and 4B, RCS coverage in aspect angle region 565a and its corresponding angles in region 565b may be reduced. Radar electromagnetic radiation 515 entering the lens 520 from any angle in aspect angle region 570a may focus at a corresponding spot along the same aspect angle in the range of angles in region 570b internal to the SDL. The electromagnetic radiation 515 may then be retro-reflected from the interior reflective surface 505, out the SDL, and directly to the monostatic receiver. Electromagnetic radiation 515 entering the lens 520 within the range of aspect angle region 565a preferably impinge onto the RAM 450 overlaying the reflective surface 505 where electromagnetic radiation 515 is absorbed. As a result, RCS reflections originating from aspect angle region 565a are usually minimized. Electromagnetic radiation 515 entering the lens 520 from aspect angle region 575a generally pass through the lens 520 and out the opposite side where the reflective surface 505 exists. Otherwise, if aspect angle region 575a extends beyond its corresponding region 575b, then electromagnetic radiation 515 entering the lens 520 from that aspect angle region 575a may be partially obscured by the reflective surface or RAM 450.

Although minimum RCS coverage over aspect angle region 565a could theoretically be achieved by simply removing both the RAM 450 and interior reflective surface 505 at the associated rear surface of the lens 520, metallic structures located behind the forward SDLs 405, 410 and/or rear SDLs 415, 420 (e.g., metallic mounting bracket (not shown)) can still cause undesired reflections. The mounting bracket may be attached onto the rear external surface of these SDLs and may occupy the entire rear surface area of the SDLs. Therefore, by utilizing RAM 450 over the reflective surface 505, as described above, any undesired reflections associated with the mounting bracket may be reduced, thereby minimizing the RCS of the aircraft.

FIG. 4B depicts a front elevation view of one embodiment of the forward SDLs 405, 410 and/or rear SDLs 415, 420 with RAM 450. Specifically, FIG. 4B directly shows an internal view of the reflective surface 505 and how portions of the reflective surface 505 may be overlaid with RAM 450. Importantly, FIG. 4B shows that the RAM 450 may be applied to a single side portion of the reflective surface 505 and no more than ⅓ of the reflective surface area. In this manner, the RAM 450 may reduce any undesired reflections of the electromagnetic radiation 515 associated with the mounting bracket and thus may minimize the RCS of the aircraft in aspect angle region 565a, which generally controls RCS overlap of SDLs 405, 410, 415, 420.

Figure 5A:
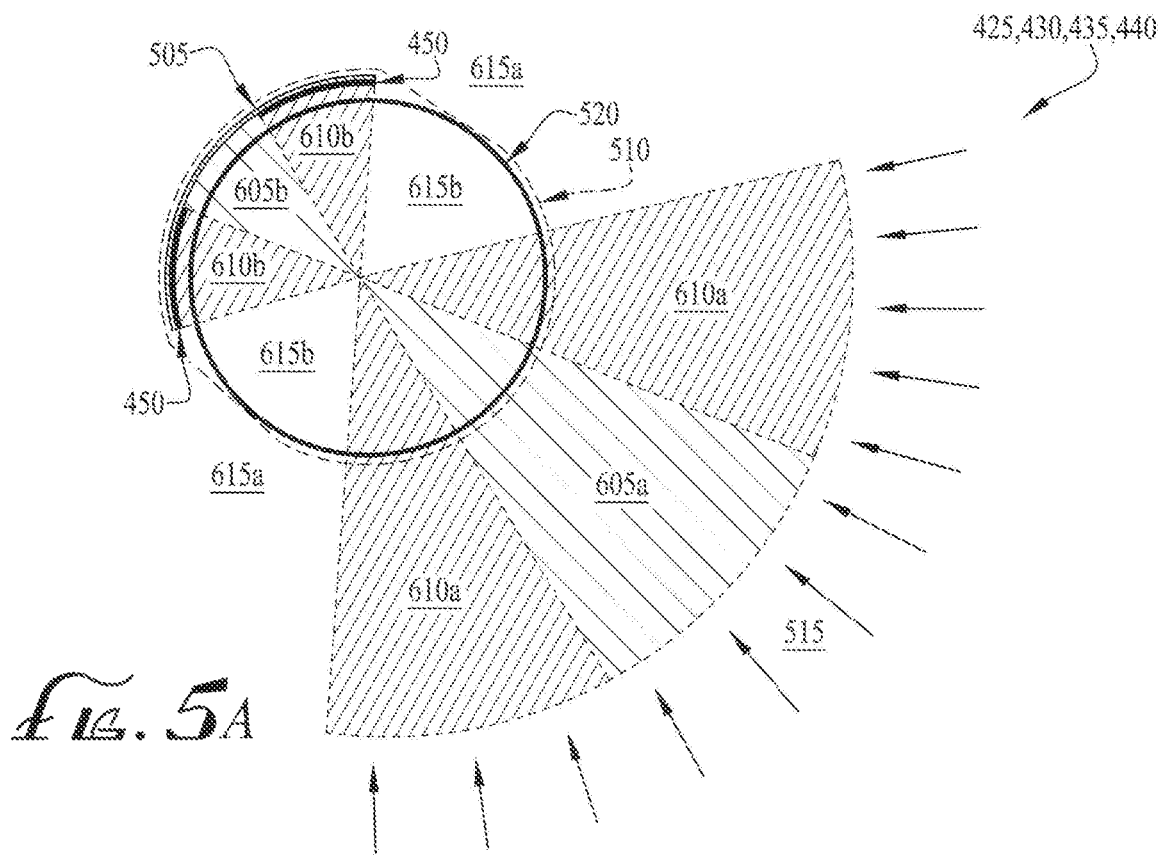
FIGS. 5A and 5B are illustrations of a top plan view and front elevation view, respectively, of embodiments of the mid-body SDLs with RAM.
Figure 5B:
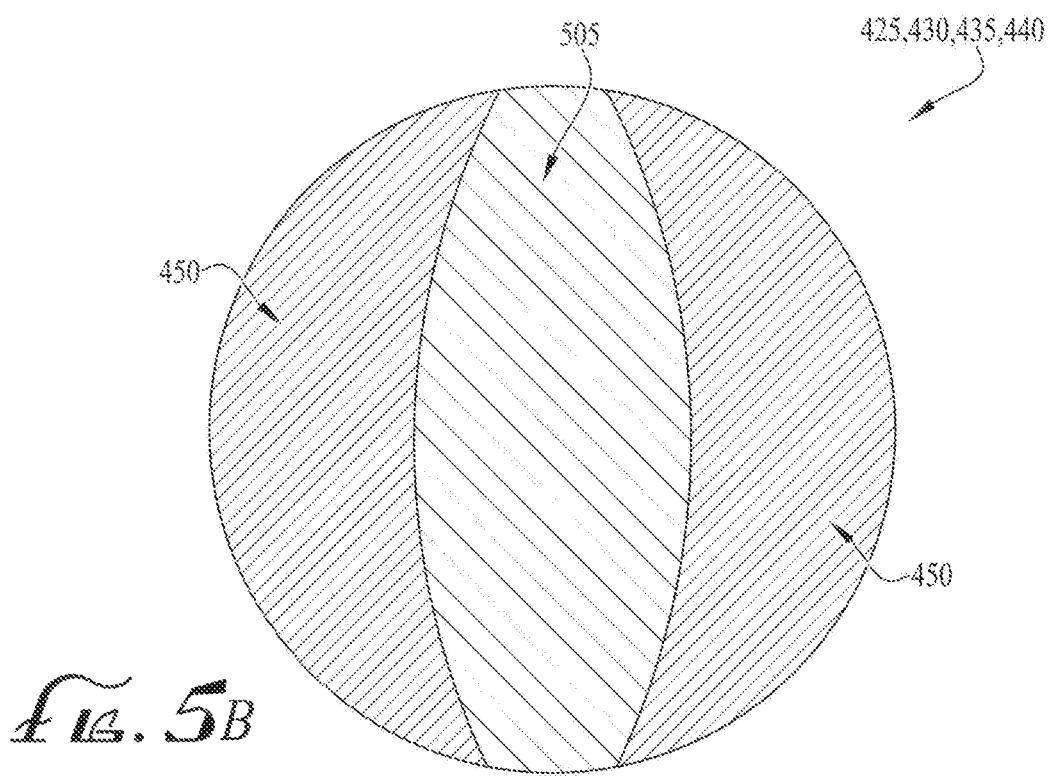

FIGS. 5A and 5B are illustrations of a top plan view and front elevation view, respectively, of embodiments of the mid-body SDLs with radar absorbing material. Like FIG. 4A, FIG. 5A shows how electromagnetic radiation 515 may interact with the interior reflective surface 505 and RAM 450 within the mid-body SDLs 425, 430, 435, 440 and shows how RAM 450 affects RCS coverage.

As shown, for the mid-body SDLs 425, 430, 435, 440, the RAM 450 may be applied to a wider surface area on both sides of the reflective surface 505. In this manner, RCS coverage of the mid-body SDLs 425, 430, 435, 440 may be limited to +/−20 degrees centered on broadside, shown by coverage aspect angles 605a. The RAM 450 also preferably minimizes RCS coverage in the remaining aspect angle regions.

Specifically, like the forward SDLs 405, 410 and rear SDLs 415, 420, radar electromagnetic radiation 515 may enter the lens 520 from any angle over aspect angle regions 605a, 610a. As the electromagnetic radiation 515 enters the lens 520 from aspect angle regions 605a, 610a, this electromagnetic radiation 515 may focus onto a corresponding spot along the same aspect angle in regions 605b, 610b internal to the mid-body SDLs 425, 430, 435, 440 on the reflective surface 505. As a result, the electromagnetic radiation 515 may be reflected out of the mid-body SDL 425, 430, 435, 440 directly to the monostatic radar receiver. Electromagnetic radiation 515 entering the lens 520 from aspect angle region 610a preferably impinges onto RAM 450 overlaying the reflective surface 505 where electromagnetic radiation 515 is absorbed. This in turn may minimize or reduce RCS reflections over aspect angle region 610a. Electromagnetic radiation 515 entering the lens 520 within aspect angle region 615a, on the other hand, may be partially obscured by the reflective surface 505 and may pass through the lens 520 and out the opposing side where no reflective surface 505 exists. As a result, RCS coverage may be reduced or minimized for aspect angle region 615a if aspect angle region 615a extends beyond region 615b.

Importantly, unlike the forward SDLs 405, 410 and rear SDLs 415, 420, the RAM 450 may be applied to a wider surface area on both sides of the interior reflective surface 505. This may allow the mid-body SDLs 425, 430, 435, 440 to limit RCS coverage to approximately +/−20 degrees centered broadside covered by aspect angle region 605a. As recited above, the RAM 450 preferably minimizes RCS in the remaining regions covered by aspect angle region 610a.

FIG. 5B depicts a front elevation view of one embodiment of the mid-body SDL 425, 430, 435, 440 with RAM 450 and shows a direct internal view of the reflective surface 505 and areas overlaid with RAM 450. Importantly, FIG. 5B shows how portions of the reflective surface 505 may be overlaid with RAM 450. In particular, unlike the forward SDLs 405, 410 and rear SDLs 415, 420, RAM 450 may be applied to a wider surface area on both sides of the reflective surface 505. In this manner, the RAM 450 may reduce any undesired reflections of the electromagnetic radiation 515 associated with scintillation caused by adjacent SDLs. In one embodiment, RAM 450 may be applied to both sides of the reflective surface 505 and no more than ⅔ of the reflective surface area.

Figure 6:
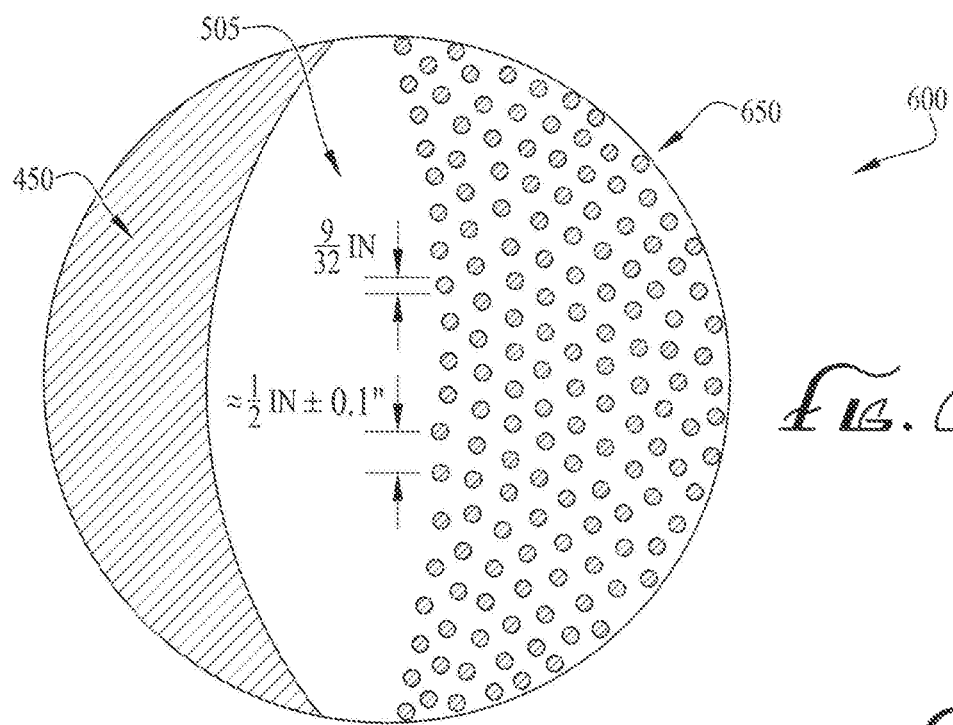
FIG. 6 is a front elevation view of another embodiment of an SDL with sparsely-applied RAM.

FIG. 6 is a front elevation view of another embodiment of an SDL with sparsely-applied RAM. As shown in FIG. 6, another embodiment of the SDL 600 may comprise a reflective surface 505 overlaid with RAM 450 and sparsely-applied RAM 650. In particular, FIG. 6 shows that RAM 450 may be completely and uniformly applied to one side of the interior reflective surface 505, whereas sparsely-applied RAM 650 may be added to the other side and dot-shaped. In this manner, the sparsely-applied RAM 650 may partially reduce undesired reflections of electromagnetic radiation 515 over a specific aspect angle region. In other embodiments, both sides of the reflective surface 505 may only include sparsely-applied RAM 650.

Notably, the amount and the geometric shape of sparsely-applied RAM 650 used on the reflective surface 505 may affect the level of RCS attenuation. Thus, controlling RCS attenuation by a few decibels (dB) may be accomplished simply by incorporating sparsely-applied RAM 650 as dots, rather than, a complete and uniform application (i.e., RAM 450). For example, in one embodiment, sparsely-applied RAM 650 may be applied as dots having a diameter of approximately 0.24λ. Center-to-center spacing between the sparsely-applied RAM 650 dots may also be approximately 0.4λ. Therefore, to achieve partial RCS reduction for this embodiment shown in FIG. 6, the sparsely-applied RAM 650 for 8.63-inch diameter SDL lens may be embodied as circular dots having a diameter of approximately 9⁄32 inches with center-to-center spacing of approximately 0.5 inches. In various embodiments, the relative dot separation may vary from 0.5 inches up to about ±0.1 inches.

In addition to the amount and geometric shape of the sparsely-applied RAM 650, the attenuation properties of uniformly applied RAM 450 and sparsely-applied RAM 650 may affect the level of RCS attenuation. Thus, in order to achieve proper performance, both the RAM 450 and sparsely-applied RAM 650 is preferably secured close to the interior reflective surface 505 (i.e., no more than about a couple of millimeters of separation). As such, by adding the sparsely-applied RAM 650 in a dot-like fashion, the sparsely-applied RAM 650 may partially reduce the RCS in the corresponding aspect angle regions, dependent upon the dot size, spacing, and material properties.

Figure 7:
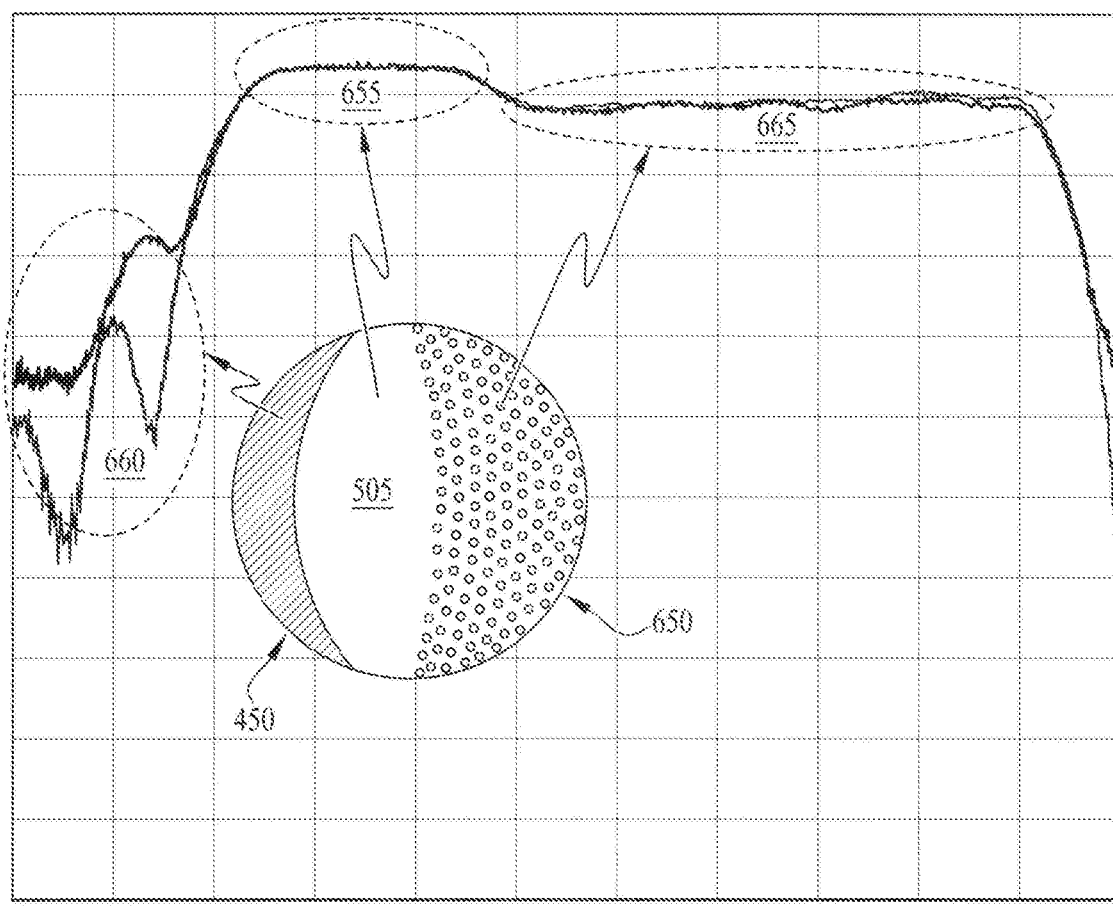
FIG. 7, is an illustration of another embodiment of an SDL with sparsely-applied RAM and shows the resulting RCS formed from the various surface areas of the SDL.

FIG. 7, is an illustration of another embodiment of an SDL with sparsely-applied RAM and shows the resulting RCS formed from the various surface areas of the SDL. In particular, FIG. 7 shows the correlation of the reflective surface 505, RAM 450, and sparsely-applied RAM 650 and their corresponding RCS coverage with respect to angular regions 655, 660, and 665. The reflective surface 505 may also have portions completely covered by RAM 450 and sparsely covered in a dot-like fashion (i.e., sparsely-applied RAM 650).

Importantly, FIG. 7 shows that radar signals from aspect angles that focus on the reflective surface 505 may have maximum RCS measurements in angular region 655. On the other hand, electromagnetic radar signals arriving from aspect angles from regions fully covered of RAM 450 may fully attenuate the corresponding RCS shown in angular region 660. Radar signals arriving from aspect angles that focus onto the sparsely-applied RAM 650 covered area may partially attenuate the corresponding RCS, as shown in angular region 665.

Figure 8A:
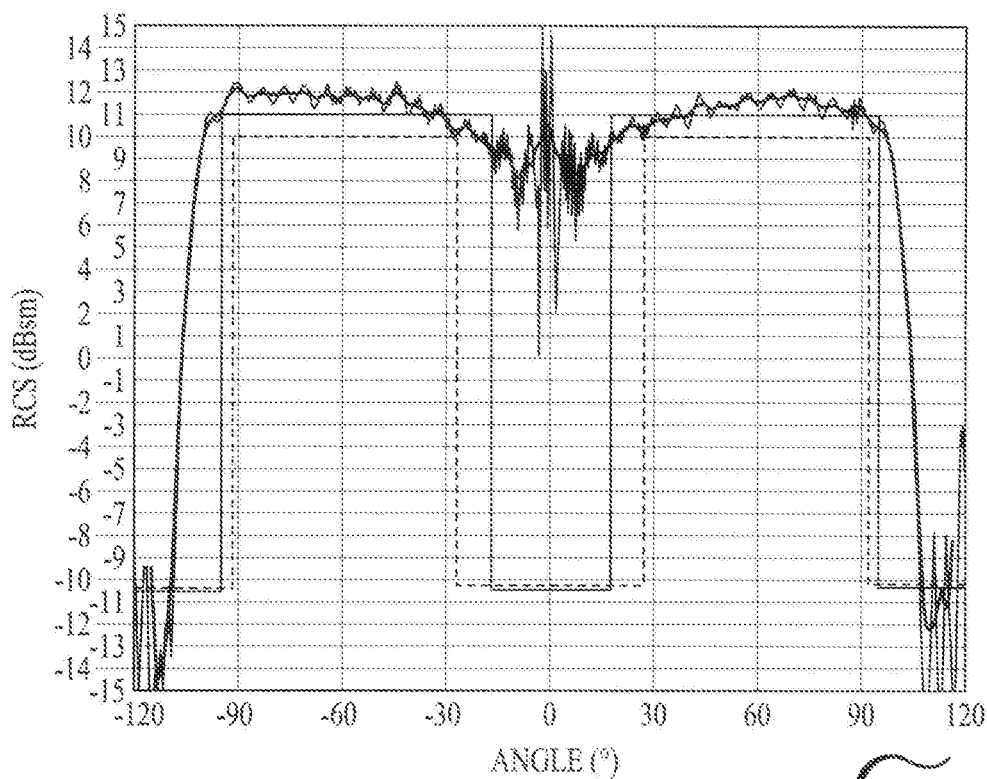
FIGS. 8A to 8C are graphs depicting the resulting RCS created by embodiments of the forward SDL, rear SDL, and mid-body SDLs, respectively.
Figure 8B:
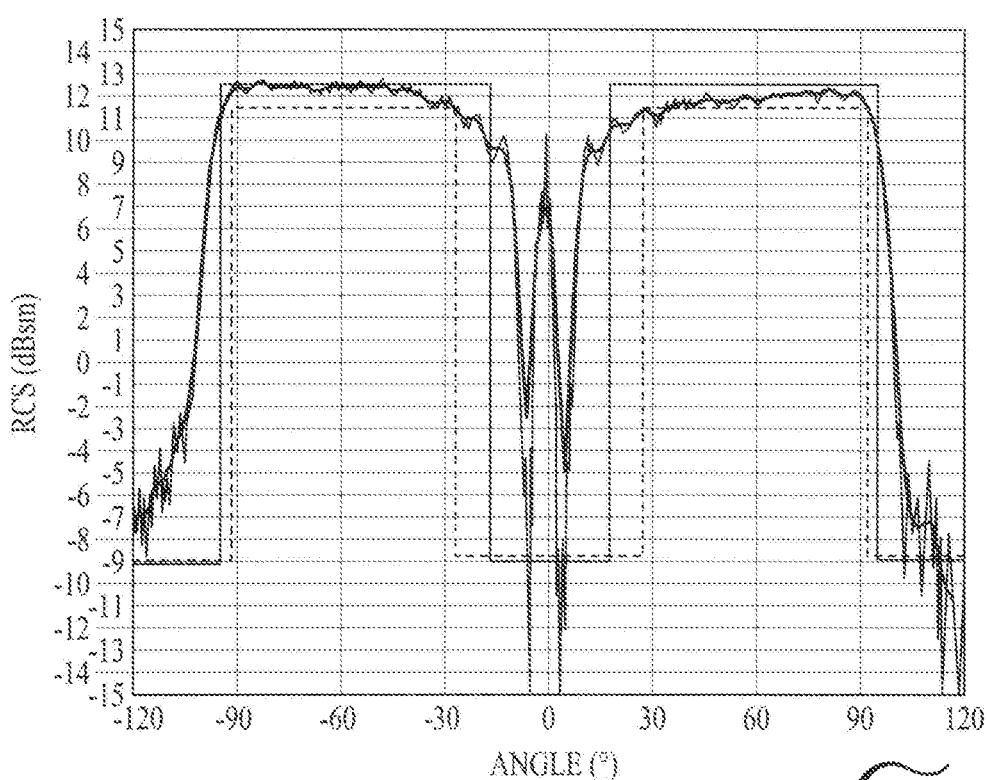
Figure 8C:
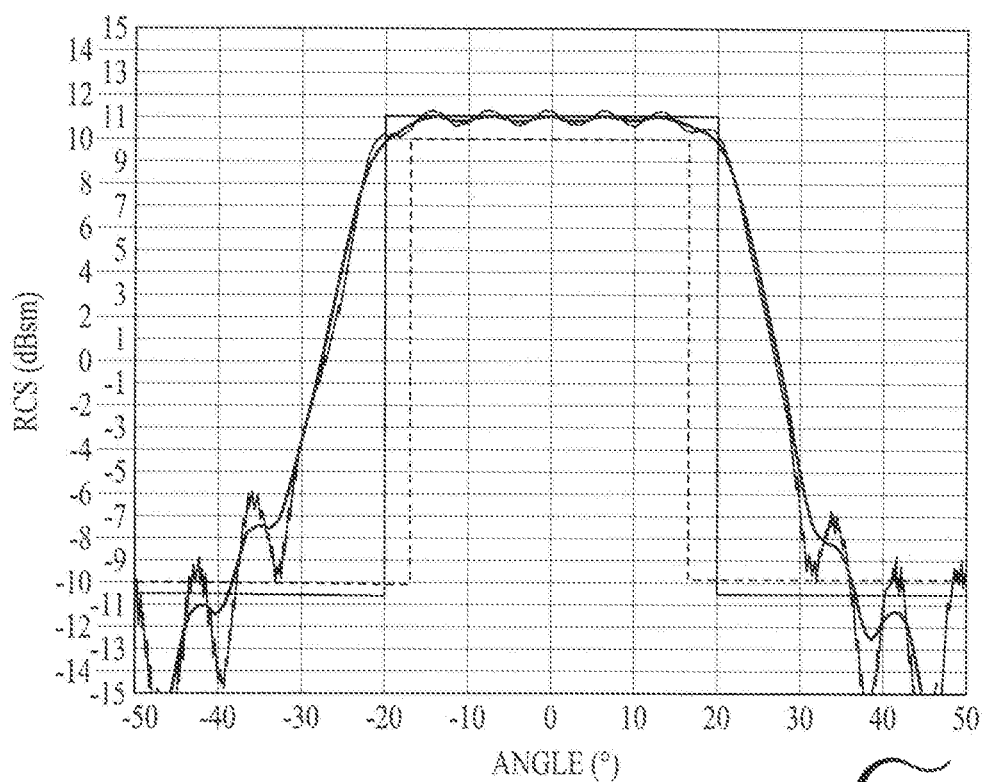

FIGS. 8A to 8C are graphs depicting the test results of RCS coverage created by embodiments of the forward SDL, rear SDL, and mid-body SDLs, respectively. In particular, FIG. 8A depicts graph showing RCS coverage by embodiments of the 8-inch diameter forward SDL and 8-inch diameter rear SDL; FIG. 8B depicts a graph showing RCS coverage by embodiments of the 8.63-inch diameter forward SDL and 8.63-inch diameter rear SDL; and FIG. 8C depicts a graph showing RCS coverage by embodiments of the 8-inch diameter mid-body SDL.

During testing, the forward SDL and rear SDL were tested together at the same time and were mounted on a test pod, separated from each other at a distance similar to the length of a pod. The mid-body SDLs were tested separately and were each mounted on a foam column. The forward SDL, rear SDL, and mid-body SDLs were tested in an anechoic chamber and exposed to electromagnetic radiation at various aspect angles in order to determine RCS coverage.

For FIGS. 8A and 8B, the aspect angles of interest are: (1) between −120 to −30 degrees and (2) between 60 to 120 degrees. The RCS coverage for angles between −30 to 60 degrees, however, are generally ignored because these aspect angles are not representative of the forward SDL and rear SDL in this test condition. Importantly, FIGS. 8A to 8C shows that RAM 450 preferably provides over 20 dB RCS reduction in the forward and aft aspect angle regions, as intended. These SDLs were also designed to provide about 5 degrees of overlap beyond −90 and 90 degrees in order to prevent intentional RCS null in the nose and tail directions of the aircraft when utilizing the system. Finally, FIGS. 8A to 8C show that there is a 20 dB RCS reduction in the aspect angle regions that utilize RAM 450.

Figure 9:
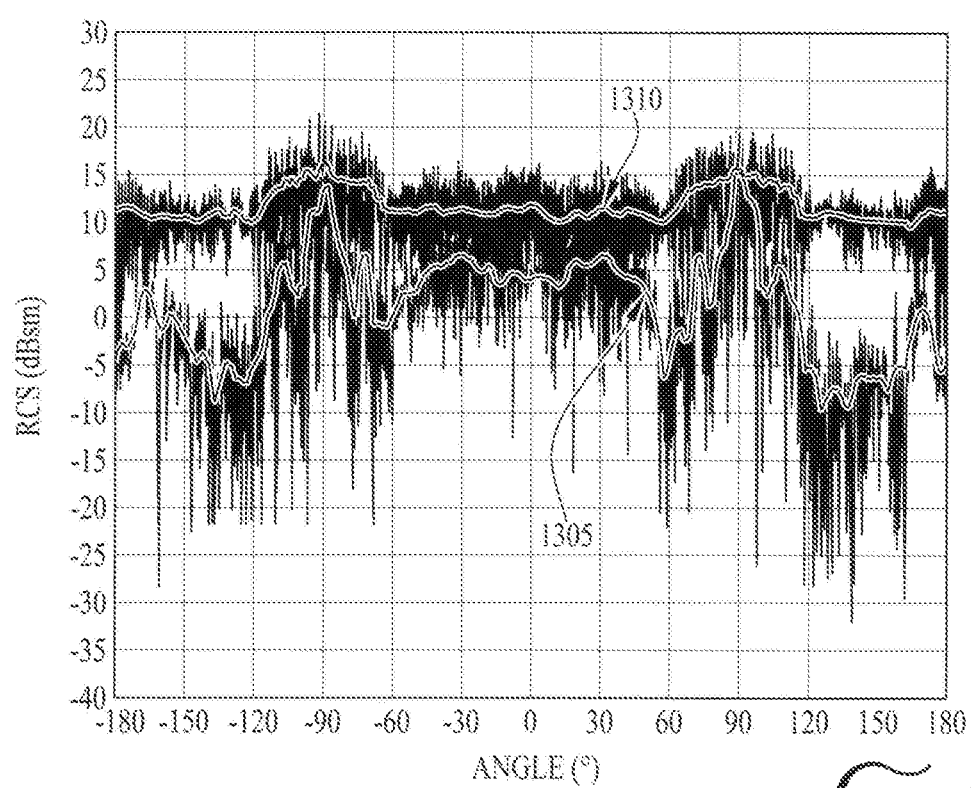
FIG. 9 is a graph depicting differences in RCS coverage for an aircraft with and without embodiments of the system described herein.

FIG. 9 is a graph depicting differences in RCS coverage for an aircraft with and without embodiments of the system described herein. Specifically, FIG. 9 depicts two plots 1305, 1310 representing the RCS of an aircraft without the system 1000 and with the system 1000, respectively. In particular, FIG. 9 shows that, for all aspect angles, the RCS with the system 1000 shown in plot 1310 is increased over the RCS without the system 1000 shown in plot 1305. Additionally, the RCS increase shown in plot 1310 ranges from 10 to 20 dB as compared to the RCS shown in plot 1305.

Figure 10A:
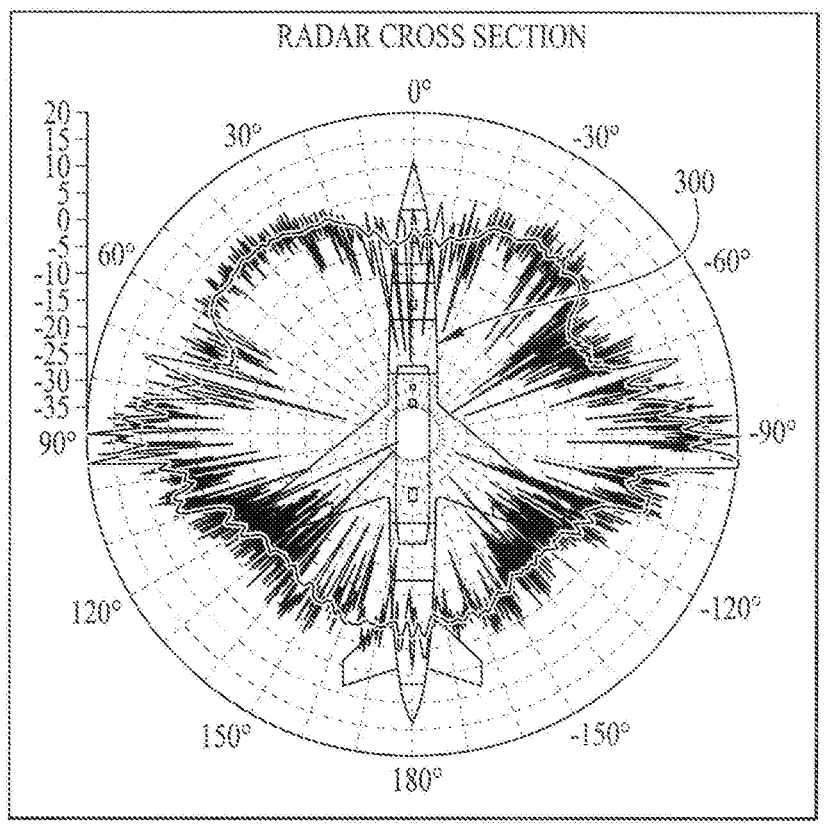
FIGS. 10A and 10B are polar plot graphs depicting RCS coverage for an aircraft with and without embodiments of the system described herein, respectively.
Figure 10B:
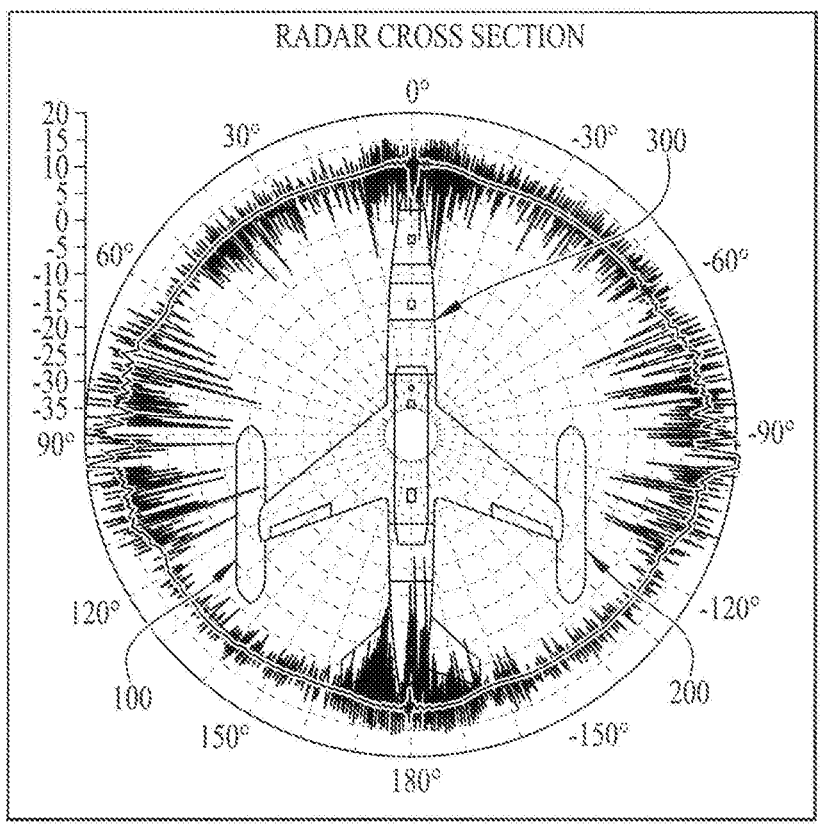

FIGS. 10A and 10B are polar plot graphs depicting RCS coverage for an aircraft with and without embodiments of the system described herein respectively. Specifically, FIG. 10A depicts a polar plot graph for an aircraft without the system 1000. FIG. 10B, on the other hand, depicts a polar plot graph for an aircraft with the system 1000. FIGS. 10A and 10B both show that the RCS for aircraft generally increases when the system 1000 is installed on the wing tip of the aircraft.

The foregoing description of the embodiments of the system for augmenting 360-degree aspect monostatic RCS of an aircraft has been presented for the purposes of illustration and description. While multiple embodiments of the system are disclosed, other embodiments will become apparent to those skilled in the art from the above detailed description. As will be realized, these embodiments are capable of modifications in various obvious aspects, all without departing from the spirit and scope of the present disclosure. Accordingly, the detailed description is to be regarded as illustrative in nature and not restrictive.

Although embodiments of the system are described in considerable detail, other versions are possible such as, for example, orienting and/or attaching components in different fashion. Therefore, the spirit and scope of the appended claims should not be limited to the description of versions included herein.

Except as stated immediately above, nothing which has been stated or illustrated is intended or should be interpreted to cause a dedication of any component, step, feature, object, benefit, advantage, or equivalent to the public, regardless of whether it is or is not recited in the claims. The scope of protection is limited solely by the claims that now follow, and that scope is intended to be broad as is reasonably consistent with the language that is used in the claims. The scope of protection is also intended to be broad to encompass all structural and functional equivalents.

What is claimed as new and desired to be protected by Letters Patent is set forth in the appended claims:

1. A pod for augmenting monostatic radar cross section (RCS) of an aircraft, comprising:
   a pod housing mounted onto a wing of an aircraft and having an elongated body, which tapers forwardly to a nose and rearwardly to a tail; and
   a plurality of approximately spherical dielectric lens (SDL), comprising:
     a forward SDL disposed within said nose;
     a rear SDL disposed within said tail; and
     at least two mid-body SDLs disposed within a mid-section of said elongated body;
   wherein said plurality of SDLs is arranged to reflect electromagnetic radiation and provide RCS coverage over a region around said pod of about 0 to 180 degrees in an azimuthal plane;
   wherein said forward SDL, said rear SDL, and said at least two mid-body SDLs comprise a reflective surface located within and radar absorbing material (RAM) on at least a portion of said reflective surface;
   said RAM applied to a single side portion and no more than one-third of said reflective surface of said forward SDL and said rear SDL;
   said RAM applied to both sides and no more than two-thirds of said reflective surface of said at least two mid-body SDLs.

2. The pod according to claim 1, characterized in that portions of said nose, said tail, and said mid-section of said elongated body are constructed of radome material that is substantially transparent to said electromagnetic radiation; and wherein said radome material portions substantially cover front hemispherical surfaces of said forward SDL, said rear SDL, and said at least two mid-body SDLs.

3. The pod, according to claim 1, characterized in that said pod housing extends along a longitudinal axis;

wherein said forward SDL and said rear SDL are situated opposite of each other on said longitudinal axis and have radiation axes at about 30 degrees and 150 degrees, respectively, relative to said longitudinal axis in said azimuthal plane;

wherein said forward SDL provides RCS coverage over a region between approximately 0 to 75 degrees in azimuth; and wherein said rear SDL provides RCS coverage over a region between approximately 105 to 180 degrees in azimuth.

4. The pod, according to claim 3, characterized in that said at least two mid-body SDLs are situated along said longitudinal axis of said pod housing and disposed between said forward SDL and said rear SDL;

wherein said radiation axes of said at least two mid-body SDLs are substantially perpendicular to said longitudinal axis in said azimuthal plane; and wherein said at least two mid-body SDLs provide RCS coverage over a region between approximately 75 to 105 degrees in azimuth.

5. The pod according to claim 1, characterized in that said forward SDL, said rear SDL, and said at least two mid-body SDLs are Luneburg lens.

6. The pod according to claim 5, characterized in that said forward SDL, said rear SDL, and said at least two mid-body SDLs have diameters of at least approximately 8-inches.

7. A system for augmenting 360-degree aspect monostatic RCS of an aircraft, comprising:

first and second pods adapted to mount on opposing wings of an aircraft and comprising first and second pod housings, respectively, each of which having an elongated body that tapers forwardly to a nose and rearwardly to a tail;

a first plurality of SDLs, comprising:
a first forward SDL disposed within said nose of said first pod housing;
a first rear SDL disposed within said tail of said first pod housing;
at least two first mid-body SDLs disposed within a mid-section of said first pod housing; and a second plurality of SDLs, comprising:
a second forward SDL disposed within said nose of said second pod housing;
a second rear SDL disposed within said tail of said second pod housing; and
at least two second mid-body SDLs disposed within a mid-section of said second pod housing;

wherein said first and second plurality of SDLs are arranged within said first and second pod housings, respectively, to reflect electromagnetic radiation and provide RCS coverage around a port side of said aircraft over a region of about 0 to 180 degrees in an azimuthal plane and around a starboard side of said aircraft over a region of about 180 to 360 degrees in said azimuthal plane;

wherein said first and second forward SDLs, said first and second rear SDLs, and said at least two first and second mid-body SDLs comprise a reflective surface located within and RAM on at least a portion of said reflective surface;

said RAM applied to a single side portion and no more than one-third of said reflective surface of each of said first forward SDL, said first rear SDL, said second forward SDL, and said second rear SDL;

said RAM applied to both sides and no more than two-thirds of said reflective surface of said at least two first mid-body SDLs and said at least two second mid-body SDLs.

8. The system, according to claim 7, characterized in that portions of said noses, said tails, and said mid-sections of said elongated bodies are constructed of radome material that is substantially transparent to said electromagnetic radiation; and wherein said radome material portions substantially cover front hemispherical surfaces of said first and second forward SDLs, said first and second rear SDLs, and said at least two first and second mid-body SDLs.

9. The system, according to claim 7, characterized in that said first and second pod housings extend along first and second longitudinal axes, respectively;

wherein said first forward SDL and said first rear SDL are situated opposite of each other on said first longitudinal axis and have radiation axes at about 30 degrees and 150 degrees, respectively, relative to said first longitudinal axis in said azimuthal plane;

wherein said second forward SDL and said second rear SDL are situated opposite of each other on said second longitudinal axis and have radiation axes at about 330 degrees and 210 degrees, respectively, relative to said second longitudinal axis in said azimuthal plane; and wherein said radiation axes of said first and second forward SDLs and said first and second rear SDLs are somewhat diametrically opposed to each other.

10. The system, according to claim 9, characterized in that said at least two first mid-body SDLs are situated along said first longitudinal axis and disposed between said first forward SDL and said first rear SDL within said first pod housing;

wherein said radiation axes of said at least two second mid-body SDLs are substantially perpendicular to said first longitudinal axis in said azimuthal plane;

wherein said at least two second mid-body SDLs are situated along said second longitudinal axis and disposed between said second forward SDL and said second rear SDL within said second pod housing; and wherein said radiation axes of said at least two second mid-body SDLs are substantially perpendicular to said second longitudinal axis in said azimuthal plane.

11. The system according to claim 7, characterized in that said first and second forward SDLs, said first and second rear SDLs, and said at least two first and second mid-body SDLs are Luneburg lens.

12. The system according to claim 11, characterized in that said first and second forward SDLs, said first and second rear SDLs, and said at least two first and second mid-body SDLs have diameters of at least approximately 8-inches.

13. A system for augmenting 360-degree aspect monostatic RCS of an aircraft, comprising: first and second wing tip pods adapted to mount on opposing wing tips of an aircraft and comprising first and second pod housings, respectively, each of which having an elongated body that tapers forwardly to a nose and rearwardly to a tail; a first plurality of SDLs, comprising: a first forward SDL disposed within said nose of said first pod housing; a first rear SDL disposed within said tail of said first pod housing; and a first pair of mid-body SDLs disposed within a mid-section of said first pod housing; and a second plurality of SDLs, comprising: a second forward SDL disposed within said nose of said second pod housing; a second rear SDL disposed within said tail of said second pod housing; and a second pair of mid-body SDLs disposed within a mid-section of said second pod housing; wherein said first and second plurality of SDLs are arranged within said first and second pod housings, respectively, to reflect electromagnetic radiation and provide RCS coverage around a port side of said aircraft over a region of about 0 to 180 degrees in an azimuthal plane, around a starboard side of said aircraft over a region of about 180 to 360 degrees in said azimuthal plane, and about +/−55 degrees in an elevation plane; and wherein said first and second forward SDLs, said first and second rear SDLs, and said first pair and second pair mid-body SDLs comprise a reflective surface located within and RAM on at least a portion of said reflective surface, said RAM applied to a single side portion and no more than one-third of said reflective surface of each of said first forward SDL, said first rear SDL, said second forward SDL, and said second rear SDL; said RAM applied to both sides and no more than two-thirds of said reflective surface of said first pair and second pair mid-body SDLs.

14. The system, according to claim 13, characterized in that portions of said noses, said tails, and said mid-sections of said elongated bodies are constructed of radome material that is substantially transparent to said electromagnetic radiation; and wherein said radome material portions substantially cover front hemispherical surfaces of said first and second forward SDLs, said first and second rear SDLs, and said first and second pairs of mid-body SDLs.

15. The system, according to claim 13, characterized in that said first and second pod housings extend along first and second longitudinal axes, respectively;

wherein said first forward SDL and said first rear SDL are situated opposite of each other on said first longitudinal axis and have radiation axes at about 30 degrees and 150 degrees, respectively, relative to said first longitudinal axis in said azimuthal plane;

wherein said second forward SDL and said second rear SDL are situated opposite of each other on said second longitudinal axis and have radiation axes at about 330 degrees and 210 degrees, respectively, relative to said second longitudinal axis in said azimuthal plane; and wherein said radiation axes of said first and second forward SDLs and said first and second rear SDLs are somewhat diametrically opposed to each other.

16. The system, according to claim 15, characterized in that said first pair of mid-body SDLs are situated along said first longitudinal axis of said first pod housing and disposed between said first forward SDL and said first rear SDL;

wherein said radiation axes of said first pair of mid-body SDLs are substantially perpendicular to said first longitudinal axis in said azimuthal plane; and wherein said first pair of mid-body SDLs provide RCS coverage over a region between approximately 75 to 105 degrees in azimuth;

wherein said second pair of mid-body SDLs are situated along said second longitudinal axis of said second pod housing and disposed between said second forward SDL and said second rear SDL;

wherein said radiation axes of said second pair of mid-body SDLs are substantially perpendicular to said second longitudinal axis in said azimuthal plane; and wherein said second pair of mid-body SDLs provide RCS coverage over a region between approximately 255 to 285 degrees in azimuth.

17. The system according to claim 13, characterized in that said first and second forward SDLs, said first and second rear SDLs, and said first and second pairs of mid-body SDLs are Luneburg lens.

18. The system according to claim 17, characterized in that said first and second forward SDLs, said first and second rear SDLs, and said first and second pairs of mid-body SDLs have diameters of at least approximately 8-inches.

* * * * *